US010983747B2

(12) United States Patent
Beveridge et al.

(10) Patent No.: US 10,983,747 B2
(45) Date of Patent: *Apr. 20, 2021

(54) REMOTE DESKTOP MIRRORING

(71) Applicant: VMware, Inc., Palo Alto, CA (US)

(72) Inventors: Daniel James Beveridge, Apollo Beach, FL (US); Blake Watts, St. George, UT (US); Jian Mu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 1006 days.

This patent is subject to a terminal disclaimer.

(21) Appl. No.: 15/250,491

(22) Filed: Aug. 29, 2016

(65) Prior Publication Data
US 2016/0364201 A1 Dec. 15, 2016

Related U.S. Application Data

(63) Continuation-in-part of application No. 14/686,769, filed on Apr. 14, 2015, which is a continuation of (Continued)

(51) Int. Cl.
G06F 3/14 (2006.01)
H04L 29/08 (2006.01)
G06F 9/451 (2018.01)
G06F 40/103 (2020.01)
H04L 29/06 (2006.01)
(Continued)

(52) U.S. Cl.
CPC .......... G06F 3/1454 (2013.01); G06F 9/452 (2018.02); G06F 40/103 (2020.01); H04L 67/08 (2013.01); H04L 67/16 (2013.01); H04L 67/28 (2013.01); H04L 67/36 (2013.01); H04L 63/08 (2013.01); H04W 4/00 (2013.01); H04W 4/023 (2013.01)

(58) Field of Classification Search
CPC ....... G06F 3/1454; G06F 17/211; H04L 67/28
USPC ....................................... 715/740
See application file for complete search history.

(56) References Cited

U.S. PATENT DOCUMENTS 4,467,421 A    8/1984  White
6,052,737 A *  4/2000  Bitton ............... H04L 29/06
                                                709/228

(Continued)

FOREIGN PATENT DOCUMENTS

JP    08-212187    8/1996
JP    2006-081159  2/2006

(Continued)

OTHER PUBLICATIONS

TDB-ACC-No. NA9306471 Disclosure Title: Mechanism and User Interface for Remote Mirroring of Application Windows Publication-Data: IBM Technical Disclosure Bulletin, Jun. 1993, US (Year: 1993).*

(Continued)

Primary Examiner — Henry Orr

(57) ABSTRACT

Files are mirrored between a desktop device and a mobile device in a seamless manner so that a user may work on the mirrored files on either device without having to save or send files beforehand. The user may interact with a mirrored file on a desktop, physically leave the desktop, and take a mobile device that has the mirrored file with him or her and continue interacting with the file.

18 Claims, 15 Drawing Sheets

Related U.S. Application Data application No. 13/217,484, filed on Aug. 25, 2011, now Pat. No. 9,009,219.

(60) Provisional application No. 62/211,736, filed on Aug. 29, 2015, provisional application No. 62/211,850, filed on Aug. 30, 2015, provisional application No. 62/356,507, filed on Jun. 29, 2016, provisional application No. 62/356,506, filed on Jun. 29, 2016, provisional application No. 61/508,404, filed on Jul. 15, 2011.

(51) Int. Cl.
*H04W 4/02* (2018.01)
*H04W 4/00* (2018.01)

(56) References Cited

U.S. PATENT DOCUMENTS

| | | |
|---|---|---|
| 7,117,243 B2 | 10/2006 | Peart |
| 7,181,578 B1 | 2/2007 | Guha et al. |
| 7,184,764 B2 | 2/2007 | Raviv et al. |
| 7,325,040 B2 | 1/2008 | Truong |
| 7,606,868 B1 | 10/2009 | Le et al. |
| 7,669,020 B1 | 2/2010 | Shah et al. |
| 7,847,755 B1* | 12/2010 | Hardebeck ............ G06F 3/1415 345/2.2 |
| 7,941,470 B2 | 5/2011 | Le et al. |
| 8,027,354 B1 | 9/2011 | Portolani |
| 8,112,748 B2 | 2/2012 | Pomerantz |
| 8,234,236 B2 | 7/2012 | Beaty |
| 8,261,268 B1 | 9/2012 | Forgette |
| 8,266,311 B2 | 9/2012 | Virdi et al. |
| 8,271,528 B1 | 9/2012 | Wilkinson et al. |
| 8,356,084 B2 | 1/2013 | Yamamoto |
| 8,410,994 B1* | 4/2013 | Testa ............ G06F 3/14 345/1.3 |
| 8,433,802 B2 | 4/2013 | Head et al. |
| 8,555,274 B1 | 10/2013 | Chawla et al. |
| 9,009,219 B2 | 4/2015 | Chawla et al. |
| 2001/0004744 A1* | 6/2001 | Lazaridis ............ H04L 51/38 709/206 |
| 2002/0057295 A1* | 5/2002 | Panasyuk ............ G06F 9/541 715/804 |
| 2002/0091697 A1* | 7/2002 | Huang ............ G06F 16/9535 |
| 2003/0088633 A1* | 5/2003 | Chiu ............ H04L 29/06 709/206 |
| 2003/0195950 A1 | 10/2003 | Huang et al. |
| 2005/0081158 A1* | 4/2005 | Hwang ............ G06Q 30/02 715/740 |
| 2006/0080397 A1 | 4/2006 | Chene et al. |
| 2006/0184614 A1* | 8/2006 | Baratto ............ G06F 3/14 709/203 |
| 2006/0288306 A1* | 12/2006 | Mahajan ............ G06F 9/452 715/804 |
| 2007/0124406 A1* | 5/2007 | Liu ............ H04L 67/025 709/209 |
| 2007/0174410 A1 | 7/2007 | Croft et al. |
| 2007/0180493 A1 | 8/2007 | Croft et al. |
| 2007/0186212 A1 | 8/2007 | Mazzaferri et al. |
| 2007/0192329 A1* | 8/2007 | Croft ............ G06F 3/1415 |
| 2007/0198656 A1 | 8/2007 | Mazzaferri et al. |
| 2007/0204011 A1 | 8/2007 | Shaver et al. |
| 2007/0260702 A1 | 11/2007 | Richardson et al. |
| 2008/0034071 A1 | 2/2008 | Wilkinson et al. |
| 2008/0250424 A1 | 10/2008 | Brugiolo et al. |
| 2008/0281798 A1 | 11/2008 | Chatterjee et al. |
| 2008/0320583 A1 | 12/2008 | Sharma et al. |
| 2009/0006537 A1 | 1/2009 | Palekar et al. |
| 2009/0094523 A1 | 4/2009 | Treder et al. |
| 2009/0210817 A1* | 8/2009 | Schmieder ............ G06F 3/1462 715/781 |
| 2009/0216975 A1 | 8/2009 | Halperin et al. |
| 2009/0235358 A1 | 9/2009 | Tolba |
| 2009/0240904 A1 | 9/2009 | Austruy et al. |
| 2010/0070870 A1 | 3/2010 | Halperin et al. |
| 2010/0070978 A1 | 3/2010 | Chawla et al. |
| 2010/0114867 A1 | 5/2010 | Olston |
| 2010/0131654 A1 | 5/2010 | Malakapalli et al. |
| 2010/0131949 A1 | 5/2010 | Ferris |
| 2010/0191783 A1 | 7/2010 | Mason |
| 2010/0199276 A1 | 8/2010 | Umbehocker |
| 2010/0211944 A1 | 8/2010 | Kaneda |
| 2010/0268813 A1* | 10/2010 | Pahlavan ............ H04L 67/08 709/224 |
| 2010/0269152 A1 | 10/2010 | Pahlavan et al. |
| 2010/0274784 A1 | 10/2010 | Acharya |
| 2011/0004680 A1 | 1/2011 | Ryman |
| 2011/0066668 A1 | 3/2011 | Guarraci |
| 2011/0099297 A1 | 4/2011 | Hayton |
| 2011/0119668 A1 | 5/2011 | Calder et al. |
| 2011/0153716 A1 | 6/2011 | Malakapalli et al. |
| 2011/0184993 A1 | 7/2011 | Chawla |
| 2011/0185292 A1 | 7/2011 | Chawla et al. |
| 2011/0185355 A1 | 7/2011 | Chawla et al. |
| 2011/0209064 A1 | 8/2011 | Jorgensen et al. |
| 2011/0213855 A1* | 9/2011 | King ............ H04L 67/02 709/217 |
| 2011/0225544 A1* | 9/2011 | Demar ............ G06F 3/0481 715/800 |
| 2012/0042252 A1* | 2/2012 | Neerudu ............ G06F 3/1454 715/733 |
| 2012/0042275 A1* | 2/2012 | Neerudu ............ G06F 3/1454 715/781 |
| 2012/0086717 A1* | 4/2012 | Liu ............ G06F 3/1423 345/564 |
| 2012/0096364 A1* | 4/2012 | Wilkinson ............ G06F 9/505 715/740 |
| 2012/0151373 A1* | 6/2012 | Kominac ............ H04L 67/2823 715/740 |
| 2012/0192084 A1* | 7/2012 | Dura ............ G06F 3/0481 715/751 |
| 2013/0007224 A1* | 1/2013 | Yang ............ H04L 67/08 709/219 |
| 2013/0018939 A1 | 1/2013 | Chawla et al. |
| 2014/0026057 A1* | 1/2014 | Kimpton ............ G06F 9/451 715/733 |
| 2014/0032635 A1* | 1/2014 | Pimmel ............ H04N 21/4126 709/203 |
| 2015/0141076 A1* | 5/2015 | Libin ............ H04W 4/60 455/557 |

FOREIGN PATENT DOCUMENTS

| | | |
|---|---|---|
| JP | 2008-511931 | 4/2008 |
| JP | 2009-230253 | 10/2009 |

OTHER PUBLICATIONS

European Patent Office, International Search Report and Written Opinion for PCT/US2010/046377, dated Jan. 30, 2013, 11 pages.
QuickOffice, Inc., QuickOffice Pro for iPhone and iPod Touch, Version 4.0.0, User Help Guide, Jan. 1, 2010, 42 pages.
Tedd Fox, Citrix Received >> XenApp—Citrix Community, http://community.citrix.com/display/xa/Citrix+Receiver, Aug. 13, 2010.
John McBride et al., Project GoldenGate >> XenApp—Citrix Community, http://community.citrix.com/display/xa/Project+GoldenGate, Jul. 1, 2011.
Office Action received in copending Australian Patent Application No. 2012284345. dated Feb. 18, 2015. 3 pages.
Japanese Office Action received in Japanese Patent Application No. 2014-520299, 6 pages.

* cited by examiner

REMOTE DESKTOP MIRRORING

CLAIM OF PRIORITY

This application claims the benefit of U.S. Provisional Patent Application Ser. No. 62/211,736, entitled "Mobile Devices in Service of Desktop Uses" filed on Aug. 29, 2015, and U.S. Provisional Patent Application Ser. No. 62/211,850, entitled "Mobile Devices in Service of Desktop Uses" filed on Aug. 30, 2015, U.S. Provisional Patent Application Ser. No. 62/356,507, entitled "Remote Desktop Mirroring" filed on Jun. 29, 2016, and U.S. Provisional Patent Application Ser. No. 62/356,506, entitled "Remote Desktop Exporting" filed on Jun. 29, 2016. This application is a continuation-in-part of U.S. patent application Ser. No. 14/686,769 entitled "Native Viewer Use for Service Results from a Remote Desktop" filed on Apr. 14, 2015, which is a continuation of U.S. patent application Ser. No. 13/217,484 entitled "Native Viewer Use for Service Results from a Remote Desktop" filed on Aug. 25, 2011, which claims the benefit of U.S. Provisional Patent Application No. 61/508,404 entitled "Native Viewer Use for Service Results from a Remote Desktop" filed on Jul. 15, 2011. All of these applications are incorporated herein by reference in their entireties for all intents and purposes.

BACKGROUND

The proliferation of mobile computing devices has, in many ways, extended the user experience from desktop and laptop computers (collectively referred to herein as "desktops" or "desktop computers") to more easily transportable devices, such as smart phones, computer tablets, mobile tablets, smart watches, smart phones or glasses, and other mobile devices (collectively referred to herein as "mobile devices"). Many software programs that were once solely used on desktops are accessible on numerous mobile devices, providing users the freedom to work either at a desktop computer, or on the go. But switching between a desktop and mobile device is not without user friction. Users typically cannot just work on a desktop and then pick up their mobile device and continue working.

Some existing solutions require that the use first saves a document on a removable drive, plug the removable drive into the mobile device, and then open the saved document from the removable drive on the mobile device. Or the user may need to log into a particular program from the mobile device to continue working on a project or view a specific program opened on the desktop. These additional steps often deter the user from using their mobile devices to continue the user experience of the desktop. Additionally, not all mobile devices are able to accommodate removable drives, or other external drives to transfer files. These existing solutions lack the portability that users associate with mobile devices.

SUMMARY

One or more embodiments described herein include a system and method to enable a document-mirroring session between a remote desktop and a client device. The document-mirroring session allows the client device to remotely access the remote desktop to have a document opened on the remote desktop mirrored onto the client device. The client device polls the remote desktop or an intermediary server for queued mirror commands related to the one or more documents operating on the remote desktop. The client device further retrieves the documents currently opened on the remote desktop and transmits the opened documents to the client device without automatically and without user intervention.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
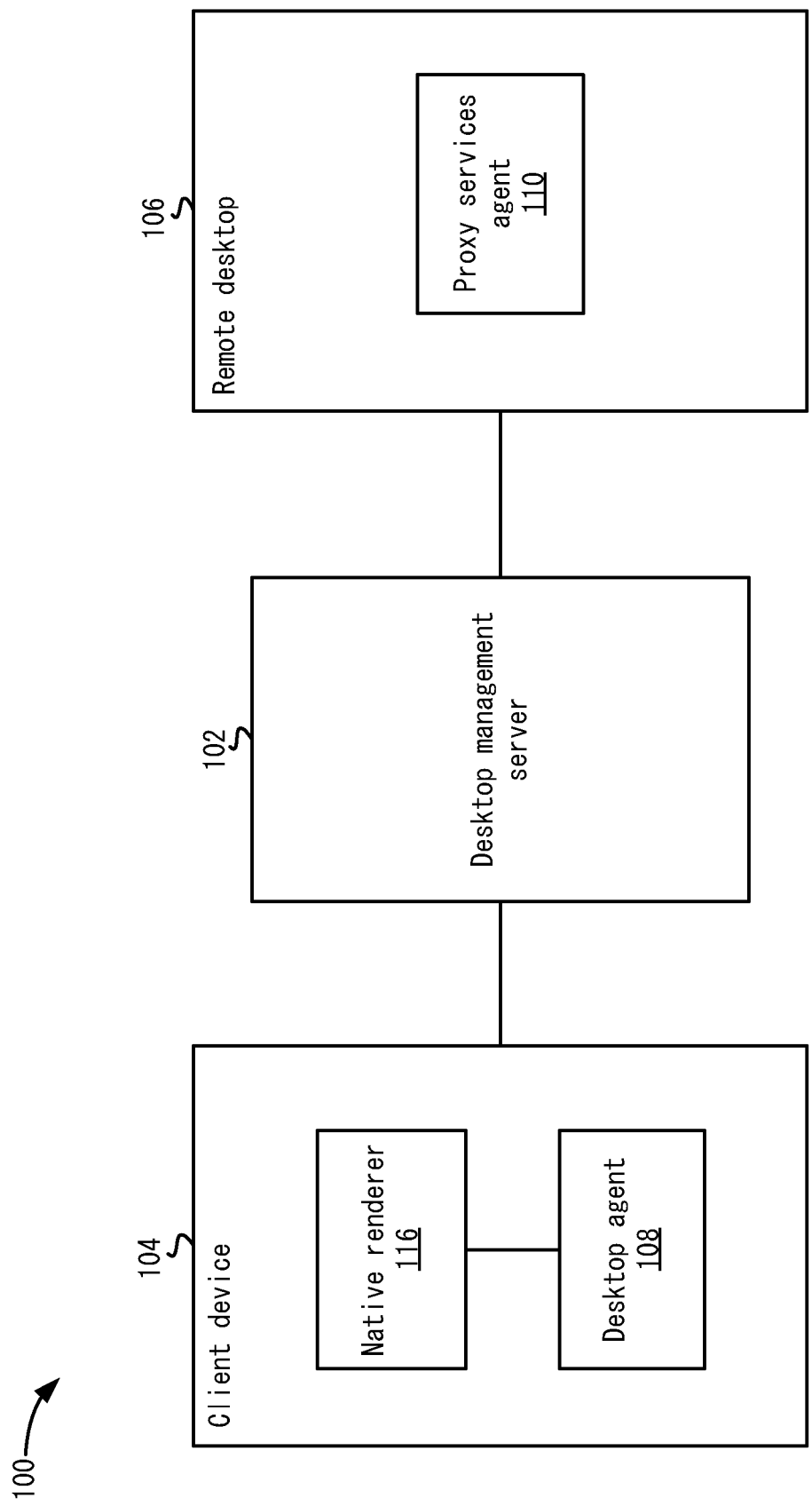
FIG. 1 illustrates a system for providing desktop services.

Embodiments discussed herein are generally directed to enhancing and extending the user desktop experience using mobile devices that seamlessly integrate with a desktop in a user-frictionless manner. More specifically, in some embodiments, documents opened on personal computer (the "remote desktop") are mirrored to a mobile client device through transferring a latest version of the opened document either through a desktop management server or directly to the client device. The disclosed document experience allows users to leave the desktop, grab their mobile device, and continue working on documents or software opened on the desktop without having to perform any additional user steps, like saving, e-mailing, and re-opening documents on the mobile device. Fluid handoff through document mirroring not only enhances user mobility and the desktop user experience, but it also increases user productivity by seamlessly leveraging aspects of nearby mobile devices to continue the user's desktop experience.

Unlike desktops where monitors are non-mobile displays, embodiments disclosed herein provide desktop-mobile device mirror functionality that gives end-users the opportunity to instantly mobilize their document consumption experience. If the desktop user is working with a document and suddenly needs to shift to a nearby conference room or new collaboration context, an embodiment allows the user to simply walk away with their tablet without exerting any extra effort to achieve instant "on-the-go" document viewing. In contrast to conventional mobile applications that use mobile tablets as generic second screens, the disclosed desktop mirroring embodiments offer users "second screen" functionality with additional "grab and go" document viewing functionality for a lower user-friction and a superior mobile user experience.

In some embodiments, documents are mirrored to registered mobile devices upon opening of the documents in the desktop. For example, a user opening a document on the desktop, in some embodiments, causes the desktop to queue commands for mirroring the opened document to one or more mobile devices registered to receive mirrored documents from the desktop. The registered mobile devices may periodically, constantly, conditionally, or otherwise poll the desktop for mirroring commands that are queued to determine whether anything needs to be mirrored to the mobile device. When the opened document's mirroring command is queued, an indication is sent back to the polling registered mobile device indicating that a document is set to be mirrored. The mobile device can then request, or the desktop may simply push without a request, the document to be mirrored.

In some embodiments, a document is mirrored by transferring the latest version of the document automatically from the remote desktop to the client device. This may be accomplished through transmission of the document first from a proxy application on the remote desktop to a server-side proxy application operated in a cloud (or server) environment, and then from the server-side proxy application to the client device. In some embodiments, the document may be mirrored back from the client device to the remote desktop in the same manner, e.g., from a proxy service application on the client device to the server-side proxy application, and from the server-side proxy application to the remote desktop. In such embodiments, document mirroring, as disclosed herein, involves a full transfer of the document. This transfer may be a one-time event, performed periodically, performed conditionally based a user working on the document, or conditioned in some other manner.

In some embodiments, updated versions of desktop documents are automatically mirrored to the client device and, perhaps, auto-queued for reading on the client device. For example, an open text document may be transmitted automatically, based on being open on the remote desktop, to the client device, which in turn automatically opens the document on the client device.

Full copies of the document to be mirrored are transmitted from the remote desktop to the client device. In some examples, the client device is notified that a newer version of the document exists, and the native reader of the client device elects to discard the current version of the document in order to flip to the new version with perhaps the same page being displayed Mobile devices typically include large form factor touch screens that are often more satisfying to read documents on than even larger desktop screens, and are generally lightweight and easily positioned or held in comfortable reading positions that allow users to control the exact distances of viewing. This is particularly helpful because users often want to shift their bodies to more comfortable positions for extended reading, view their mobile device in spaces where desktops cannot easily fit, or use the mobile devices on the go.

Users invariably optimize toward lower-friction work paths. Keeping this in mind, embodiments of the disclosure drive out as much friction as possible for users to take advantage of the mirroring features discussed herein. Any extra step or procedure needed to engage document viewing on the mobile device may be more than a user is willing to take. For this reason, embodiments introduce automatic document mirroring that allows users to consume documents, or other software, being accessed on their desktops from their mobile device instantly and with zero extra effort. In mirroring mode, a tunable set of default document types are immediately sent to one or more mobile devices registered with the desktop, so that whenever a user decides to continue their desktop viewing experience from the mobile device, there is zero-lag and zero-effort involved. This ensures the user will not need extra steps (e.g., saving, e-mailing, etc.) to extend the user experience from the remote desktop to the mobile device. For example, if a colleague stops by a user's office and asks them to join an urgent meeting, the user can simply grab their tablet and head out of the office, knowing the user can continue to review a document opened on the desktop if necessary or share it with colleagues from a projector in the conference room.

A user may have multiple devices registered to mirror a desktop at the same time. For example, a user may have two APPLE IPAD®-branded mobile tablets, an APPLE IPHONE®-branded mobile phone, a SAMSUNG GEAR®-branded watch or other wearable device, a GARMIN®-branded activity tracker, GOOGLE®-branded smart glasses, and an OCULUS RIFT®-branded virtual reality device, and all of these devices are registered to mirror documents from the desktop. The user may designate which device(s) will be the recipient(s) of a given document type during the document mirroring operations. For example, IPAD® #1 may receive Portable Document Format (PDF) documents, while IPAD® #2 receives MICROSOFT®-branded POWERPOINT® and EXCEL® documents. Documents may be mirrored to multiple devices as well, which is useful for small team presentations when each audience member can see and independently navigate within a document offered by the presenter.

Alternatively, the desktop may be configured to wirelessly mirror documents directly (as opposed to through a network) to devices within a particular piconet of a low-energy communication protocol, e.g., within a specific communicative distance and on a particular radio frequency (RF) channel or hopping sequence as the desktop.

To further reduce user friction, some embodiments automatically transfer (i.e., without user intervention) the documents from the remote desktop to the client device upon the document being brought into focus on the remote desktop or client device (e.g., whenever a user pulls up the document). Alternatively or additionally, documents automatically transfer documents that are in focus or opened on a remote desktop after a certain amount of user inactivity is detected (e.g., 5 minutes), which may indicate the user has left the remote desktop and the most desired documents to mirror are assumed to be those last in focus or currently, currently opened, recently opened (e.g., last 5 documents), or a combination thereof.

Additionally, some embodiments capture changes to the mirrored document made on the mobile device and send changed document back to the desktop, which in turn saves the changes, either over the existing opened document or as a new updated version of the document. For example, a user working on a spreadsheet opened on a desktop and mirrored on a mobile device may make changes to the mirrored spreadsheet on the mobile device, and the changes may be communicated back to the desktop and displayed on the opened document and/or saved either periodically (e.g., every 3 minutes the document is mirrored) or upon instruction of the user through the mobile device (e.g., when the user selects a "save" button).

Capturing document changes on the mobile device and updating the document on the desktop accordingly ensures that the user is truly free to seamlessly work on the document either at the desktop or the mobile device. In other words, a user can edit a document on a desktop; grab a mobile device that mirrors the document on her way to a conference room for a meeting; continue editing the document on the mobile device; and then come back to the desktop after the meeting, put down the mobile device, and continue working on the updated document—all without having to take additional steps to save and transfer the document back and forth between the two devices.

Alternatively or additionally, some embodiments mirror opened documents or applications on the mobile device to the desktop. In such embodiments, files of documents opened on the mobile device are transmitted to the desktop upon opening, and the desktop displays the opened documents. Changes made to the opened and mirrored document—whether made on the desktop or the mobile device—are communicated and displayed on both devices, allowing, again, the user to choose either device for working on the document without having to take additional steps to pass the document back and forth between devices. For example, a user may open a document in PDF on the mobile device causing the desktop to mirror the opened PDF, and a user may edit the mirrored PDF on the desktop, prompting the document changes to be communicated and shown back on the mobile device. Thus, embodiments provide two-way mirroring and editing capabilities, from the desktop to the mobile device, and vice versa. For the sake of clarity, embodiments are discussed below as mirroring an open document to a mobile device; however, alternative embodiments may perform the same functions in reverse (e.g., from the mobile device to one or more desktops).

Eliminating user-friction document consumption choices across desktop and mobile devices gives end-users new and satisfying ergonomic choices in the way they work with documents and the mobility patterns they can anticipate during their workday. The seamless handoff between desktops and mobile devices facilitate a range of enhanced productivity experiences that users will appreciate and leverage throughout their day.

For purposes of this disclosure, a "result set" includes documents to be mirrored. Also, "desktop services" include opened applications of documents to be mirrored.

Operating Architecture and Devices

Having described various embodiments of this disclosure, attention is directed to the architecture and individual devices configured to perform the desktop mirroring previously discussed. Looking at the accompanying figures, FIG. 1 depicts an exemplary system 100 for providing desktop mirroring. Users operate a mobile device, which is shown and referred to as client device 104, to interact with a desktop management server 102 to access services provided by a user's remote desktop 106. Client device 104, in some examples, uses a client services interface to have services performed by remote desktop 106. The client services interface is part of a remote desktop solution allowing access to remote desktop 106, in some embodiments.

Client device 104 sends service requests to remote desktop 106 for any documents to be mirrored. As will be described below, proxy services agent 110 provides multiple services, which include document mirroring. Proxy services agent 110 processes the request by having the service performed by remote desktop 106. A result set is generated by remote desktop 106 and proxy services agent 110 sends the document to be mirrored to client device 104. A native viewer (not shown) on client device 104 is invoked and used to display the mirrored document. With client devices 104 having a different form factor than a user's desktop, the user leverages certain features, such as touch-screen navigation and smooth scrolling provided by the native application that are available on client device 104, but are not available by remote desktop 106.

Remote desktop 106 is a physical computer system or a virtualized computer system. Physical desktops include actual physical machines being controlled remotely. Virtualized desktops export user interfaces, e.g., keyboard and mouse input, audio and visual output, to the user from virtual machines running remotely (in the datacenter) or locally on client device 104, or, in some cases, using a hybrid.

Desktop management server 102 is, in some embodiments, an interface layer that includes desktop management software with various functions. Desktop management server 102 includes a connection broker 723 (illustrated in more detail in FIG. 14, and described in the accompanying text) that allows a remote user to select a type of remote desktop (e.g., remote desktop client or client services interface) and initiate a desktop session or a connection to remote desktop 106 using client device 104.

Client device 104 includes a mobile device, such as a cellular phone, smart phone, tablet, personal computer (PC), laptop or other computing device that has a different form factor than a remote desktop. For example, remote desktop 106 virtualizes a screen size that is different from the size of the display provided by client device 104. Additionally, client device 104 run a different operating system (OS) with different application characteristics and application programming interfaces (APIs) than remote desktop 106, in some embodiments. Client device 104 includes a desktop agent 108 that communicates with desktop management server 102 or directly to remote desktop 106, which may be hosted remotely or locally by a Type 2 hypervisor running on client device 104. Desktop agent 108, in some examples, sends service requests that include requests for document mirroring to have services performed by the user's remote desktop 106. In an embodiment, a side channel for a remote desktop session is used to send the requests and receive the result sets. This side channel is used instead of a channel used to send the document of remote desktop 106 using a display protocol, in some examples. Desktop management server 102 allows non-display traffic to be sent from desktop agent 108 to remote desktop 106 in the side channel. This process is described in more detail below.

Documents to be mirrored may be queued or automatically pushed by the remote desktop 106 based upon a user setting or automatically based on the document that is open, in focus, was open (e.g., last 3 documents), changed, or a combination thereof. For example, if a user has a spreadsheet in focus, embodiments may queue the spreadsheet for mirroring, either periodically, with each change the user makes, or upon some other condition. The to-be mirrored document may then be transmitted from the remote desktop 1065 to the client device 104, either directly or through the desktop management server 102.

Proxy services agent 110 outputs a result set that includes the document to be mirrored. In one embodiment, the result set is representative of an opened document (e.g., text, spreadsheet, web, and the like) opened or recently opened (e.g., within the last 4 documents) on remote desktop 106.

For example, the result set includes a list of files that can be displayed by client device 104. Any suitable protocol or API is implemented for message transmission between client device 104 and desktop management server 102. For example, various web services protocols are used, and the message payloads are encrypted and/or compressed.

Desktop agent 108 uses a native renderer 116 to display the result set. Desktop agent 108 and native renderer 116 are, in some embodiments, integrated into a single application (or "app") that is installed onto the device. Native renderer 116 selects a native viewer and launches the native viewer to display the result set. The native viewer may be a component of the system software shipped with device 104, an add-on application or plug-in, or integrated with desktop agent 108 and/or native renderer 116. Depending on the type of information in the result set, different native viewers may be used. In one example, native viewers are used to display documents of different file formats, e.g., PDF, PPT, XLS, and DOCx, and the like. The native viewer is optimized for the screen size of client device 104, and includes features available to client device 104 that may not be available on remote desktop 106, in some embodiments. For example, different views, options, and navigation ability (e.g., zoom-in, pan, and rotate features, touch screen, etc.) are provided for locally viewed result sets. For example, a native file explorer application may be used to display a list of files.

Figure 2:
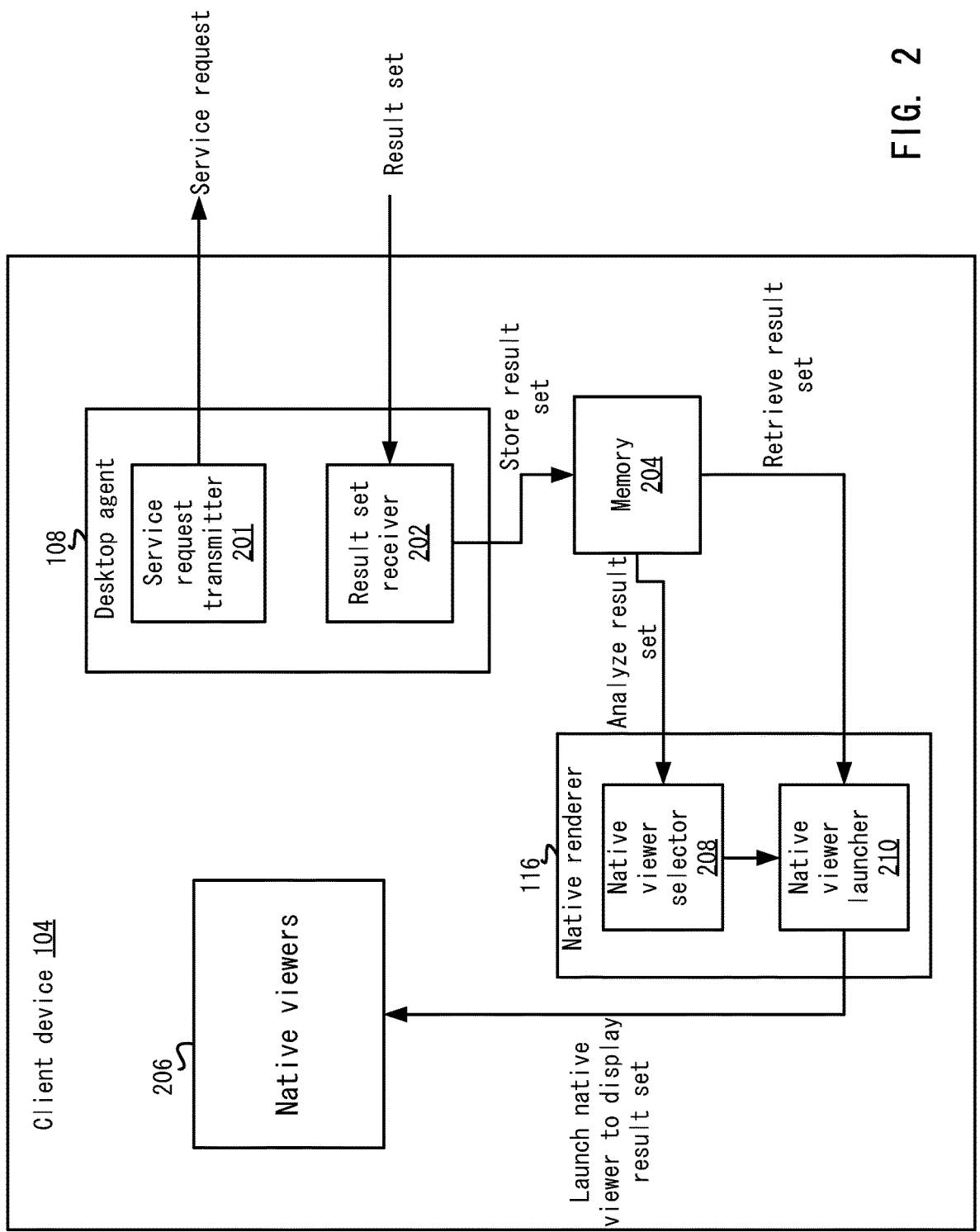
FIG. 2 illustrates a block diagram of a client device.

FIG. 2 depicts a block diagram of client device 104. The user is authenticated before access to remote desktop 106 is allowed. Once authenticated, a service request transmitter 201 is used to send a service request to remote desktop 106. A result set receiver 202 of desktop agent 108 receives a result set from proxy services agent 110. The authentication process and processing of a service request at remote desktop 106 will be described in more detail below.

Depending on implementation, service request transmitter 201 and result set receiver 202 send and receive, respectively, communications in any suitable protocol either as an independent network channel or as a side channel to an established display protocol network channel. The protocols may be able to send metadata and result sets in text-based or binary formats. Additionally, the protocol may be used across different OS platforms (e.g., IOS®-, ANDROID®-, WEBOS®-, and BLACKBERRY®-branded OSes). In an embodiment, JAVASCRIPT object notation (JSON) is used. JSON is a text-based format used for sending data over a network connection for web services. Other protocols may also be used. For example, APACHE "Thrift" is an interface definition language that is used as a remote procedure call (RPC) framework. APACHE THRIFT™-branded is a binary communication protocol and provides object-level RPC abstractions using a binary wire protocol. GOOGLE®-branded "protobuf" may be used for encoding of structured data in a binary format. In some embodiments, when files for mirroring are selected on client device 104 for retrieval, the above protocols are used when the native application restricts a client view to a limited number of files per view and paging is used where portions of files (e.g., pages) are downloaded at a time. Some of the protocols also allow compression of the files and also paging. For commonly used advanced formats like DOCx, PPTx and PDF where the file packaging format is open, the file is downloaded in pages, in some embodiments. In this case, the client services interface also needs to interface with the native viewer application in order to send pages on demand, e.g., when a user advances or scrolls beyond currently cached information.

Mirrored documents, upon being downloaded, may be stored in a memory 204, which may be local cache memory. Memory 204 (or the result set stored therein) is be encrypted and made accessible only after the user has been authenticated, in some examples. Also, memory 204 is protected from other applications on client device 104 when the user is not accessing remote desktop 106. For example, the data stored in memory 204 is not accessible by other applications other than via desktop agent 108. Known techniques for securing (e.g., encrypting) memory 204 are used, additionally. Also, result sets stored in memory 204 are persistent, in some embodiments. For example, when client device 104 is offline, the result sets in memory are still accessible. In an embodiment, memory 204 may be a fixed size. When memory 204 is of a fixed size, an eviction policy may be used to clear space in memory 204. Different methods to free up space in memory 204 are known in the art, such as a least recently used (LRU) policy. Also, although memory 204 is described as being a fixed size, memory 204 is alternatively expandable via external memory devices.

In one example, when a service request is performed, memory 204 is checked to determine if the result set (which, again, includes mirrored documents) already resides in memory 204. For example, when a file is requested, a "last modified date" time-stamp policy is used to determine if a file has been changed on remote desktop 106 before downloading the file again. If the file has not been changed, then the file is retrieved from memory 204 and displayed.

After the result set is downloaded to memory 204, a native viewer 206 renders the result set. The native viewer 206 is local to client device 104. That is, the applications, components, plugins, etc., comprising native viewers 206 are stored on client device 104 and are launched on client device 104. Typically, native viewers 206 are customized for the form factor of client device 104. In this case, native viewer 206 has different features that leverage the form factor. For example, native viewers 206 leverages touch screens and various touch commands. Also, native viewer 206 has features that are not available on applications running on remote desktop 106, in some embodiments. Additionally, the data may be displayed in a way that fits the form factor in client device 104. For example, some mobile devices have smaller screens and the data is formatted in a way to optimize the viewing of the data on those smaller screens.

The native viewer launcher 210 launches the selected native viewer 206 to display the mirrored document from the remote desktop 106 or, when mirrored the other way, from the client device 104. In an embodiment, the display the user sees would be the same as if native viewer 206 was launched to display the result set without connecting to remote desktop 106. In other embodiments, a combination of a bitmap display and native viewer 206 is used. For example, a first frame may include a bitmap representation of remote desktop 106 and a second frame may include a view of the result set (or a portion of the result set) in native viewer 206.

Figure 3:
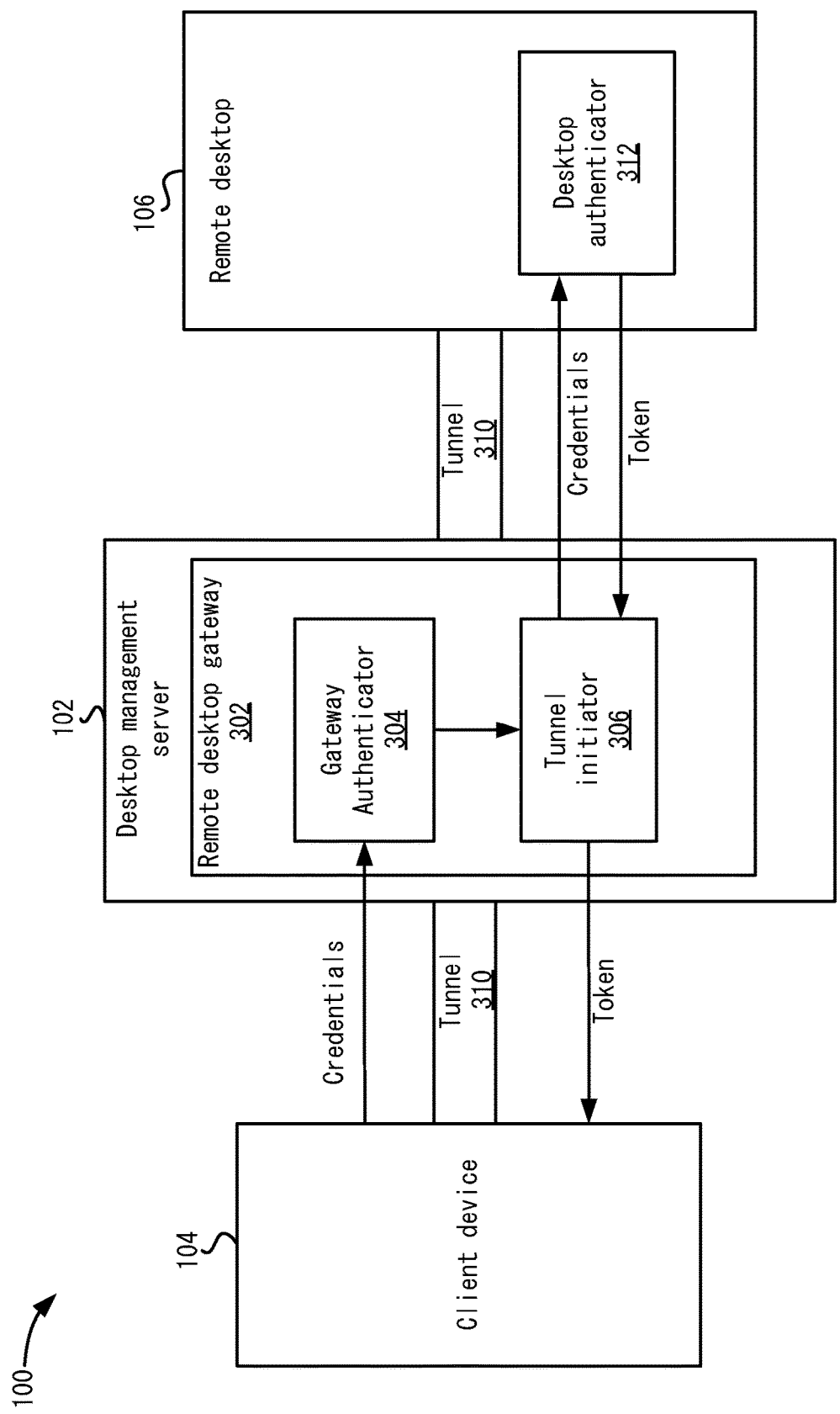
FIG. 3 illustrates a block diagram of an operating environment for authenticating the user.

The user may be authenticated before accessing remote desktop 106. FIG. 3 shows a more detailed example of system 100 for authenticating the user. A remote desktop gateway 302 is used to authenticate the user. Remote desktop gateway 302 may be deployed in a demilitarized zone (DMZ) in the data center and may be included in a connection broker 723 in FIG. 14, which is described below. In one example, a new client services interface is launched by a user to have services performed. The client services interface may be similar to a remote desktop client in terms of establishing connectivity to remote desktop 106. The illustrated configuration in FIG. 3, which is described in more detail below, is but one example configuration, and is not meant to limit all embodiments to any particular combination of devices and components.

Although the authentication is described with respect to establishing a remote desktop session, an independent authentication process may be used for establishing a session for having services performed. When the client services interface on client device 104 is launched, client device 104 provides credentials to remote desktop gateway 302. For example, enterprise credentials are provided to authenticate the access for the user to remote desktop 106. A gateway authenticator 304 authenticates the credentials. Gateway authenticator 304 may use different methods of authenticating the credentials. In one example, based on the administrative policy, the user may be asked to use a two-factor authentication. For example, the user may be required to first provide a token (e.g., RSA SECURID®-branded token) and then provides active directory credentials. This authentication process is known and need not be described further.

In an embodiment, in some cases where users are outside an enterprise network, once the user is authenticated, a tunnel initiator 306 determines a remote desktop 106 for the user. For example, a connection is initiated to a virtual machine running in the data center. The credentials are passed to the virtual machine. The virtual machine accessed may be the user's assigned virtual machine, or a generic virtual machine used just for mounting and accessing the user's virtual disk. This way, the user's virtual machine need not be running to access the user's data.

A desktop authenticator 312 is used to authenticate the user and returns a token that can be used by client device 104 for communication with remote desktop 106. Tunnel initiator 306 then initiates a tunnel 310 between client device 104, gateway 302, and remote desktop 106. Tunnel 310 allows users from outside a firewall of the enterprise to access resources hosted in the enterprise (e.g., remote desktop 106). It may not be necessary to establish a tunnel for users inside the enterprise network.

Once client device 104 is authenticated, client device 104 can send service requests for mirrored documents through tunnel 310. If the user on the same network as remote desktop 106, then communication may flow directly from client device 104 to remote desktop 106 without mediation through remote desktop gateway 302. In one example, client 104 may be provided an initial client services interface that provides various options to interact with remote desktop 106. For example, different services may be performed, such as the file explorer service, the search service, or the browser service. Client device 104 can generate and send a service request with the token through tunnel 310. Proxy services agent 110 verifies the token and can service the request.

Figure 4:
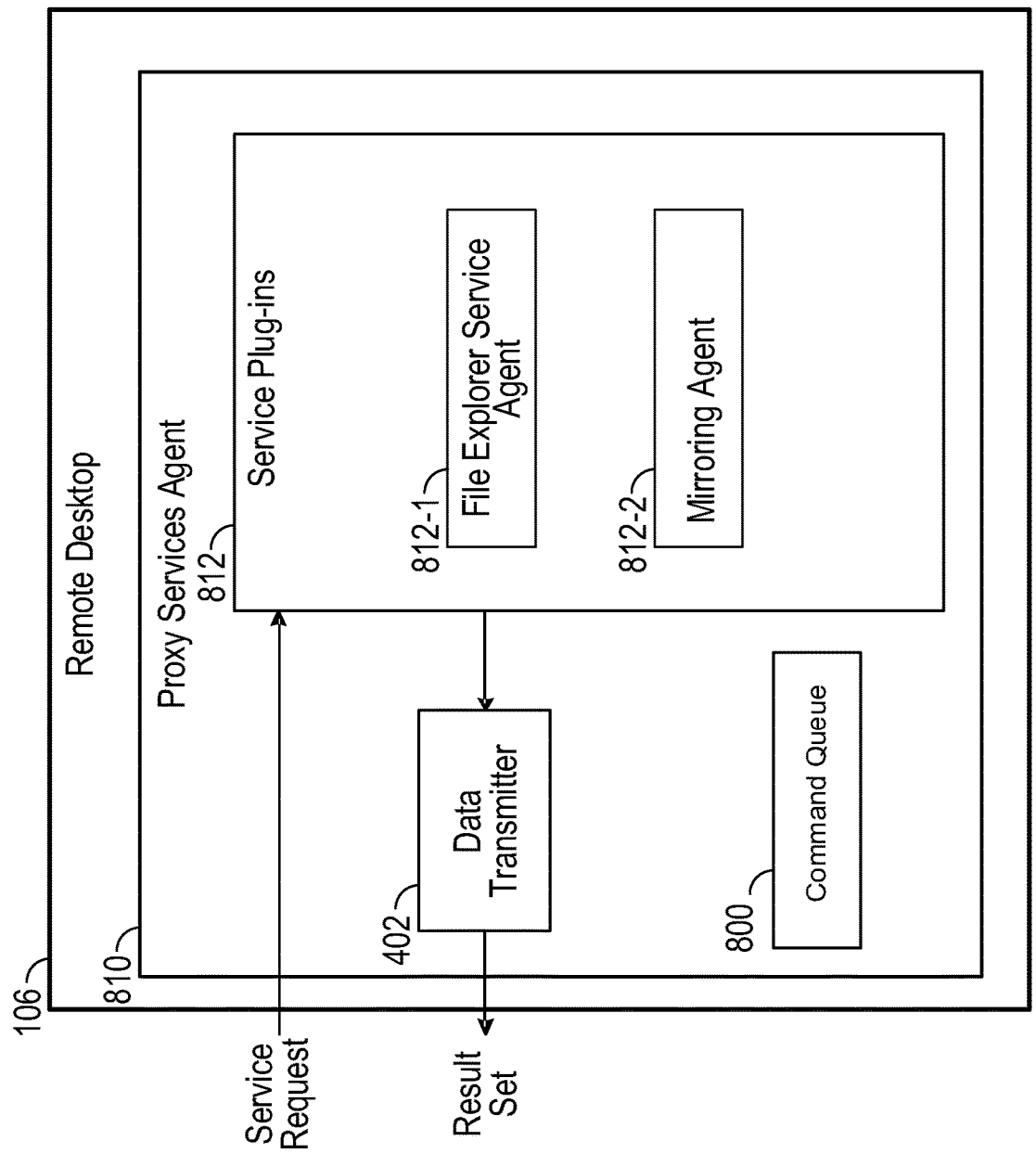
FIG. 4 illustrates a more detailed example of a proxy services agent.

FIG. 4 depicts another detailed example of proxy services agent 110. As described above, a service request may be received from a client device 104. Proxy services agent 810 includes various service plug-ins 812, including a file explorer service agent 812-1 and a mirroring agent 812-2 to process different service requests. The proxy services agent 810 also includes a command queue 800 that stores various instructions for document mirroring on the client device 104. Additional or alternative plug-ins may be used in various embodiments. Embodiments discussed below reference the remote desktop 106 mirroring with the client device 104.

In an embodiment, file explorer service agent 112-1 performs requests associated with the files stored on or accessible to remote desktop 106, and specifically retrieves file or pointers thereto associated with documents and software being mirrored between the remote desktop 106 and the client device 104. Mirroring agent 812-2 detects when particular documents to be mirrored have been opened and generates mirroring instructions (discussed below) for storage in the command queue upon opening the documents—e.g, during a double-click or file+open command pathway.

Proxy services agent 110 receives service requests for mirroring specific documents opened on the remote desktop 106. Proxy services agent 110 performs the requested services, optionally, by performing system calls to the operating system running on remote desktop 106. Also, applications running on remote desktop 106 may also be queried to perform the services. A result set gathered by proxy service agent 110 and then returned to client device 104. The type of result set may depend on the service performed. For example, proxy services agent 110 may use file explorer service agent 812-1 to output a list or locations of files.

In an embodiment, proxy services agent 110 includes a command queue 800 for storing commands for document mirroring. Command queue 800 may store any kind of data. In addition to the other commands and instructions mentioned herein, command queue 800 store instructions related for application delivery. For desktop mirroring, in an embodiment, the opening of a document on the remote desktop causes the mirroring agent 812-2 to create and queue a mirroring command in the command queue 800. In an embodiment, the mirroring command includes an instruction to mirror the opened file and one or more pointers to the opened file. The desktop agent 108 of the client device 104 may be configured to periodically poll the remote desktop 106 for commands in the command queue 800, and the remote desktop 106 exposes the commands in the command queue 800 in response. Upon receipt of the instruction to mirror the opened file on the remote desktop 106, the desktop agent 108 of the client device 104 may then request the location of the opened document.

The file explorer service agent 112-1 may either provide the pointer location to the opened file, thereby allowing the desktop agent 108 of the client device 104 to retrieve the document and display the mirrored opened file on the client device 104, or alternatively, the file explorer service agent 112-1 may pull and provide the documents to the desktop agent 108 of the client device 104 as a result set transmitted via the data transmitter 402. The mirrored document may be retrieved, in an embodiment, by either the desktop agent 108 or the file explorer service agent 112-1 using a Web Distributed Authoring and Versioning (WebDAV) protocol. The desktop agent 108 of the client device 104 displays the retrieved mirrored documents and, in an embodiment, continues polling the proxy services agent 110 and retrieving updated versions (i.e., versions that have been changed) of the opened document to continue the mirroring process.

In one particular embodiment, mirroring may occur both ways between the client device 104 and the remote desktop 106, such that changes made to the opened document on the client device 104 are stored and reflected in the document on the remote desktop 106—without the user having to transfer and save the modified document between devices. In such an embodiment, the file explorer agent 112-1 is bi-directional, meaning that it can both retrieve the opened document and receive and store the opened document.

In an embodiment, the desktop agent 108 is configured to allow a user to modify mirrored documents on the client device 104. The desktop agent 108 tracks and marks mirrored documents according to user edits, inputs, stylus touches on a touch screen of the client device 104, and the like. For example, a word document may be mirrored on the client device 104, and a user may edit the mirrored document using the pop-up keyboard on a client device 104 screen. The client device 104 may be configured to automatically—or upon user command—transmit the edited document to the remote desktop 106.

In some examples, a tunneling service agent (not illustrated) operates to tunnel mirrored documents or selected windows through a virtualized desktop infrastructure (VDI) client that is executing on another device separate from the client device 104 and the remote desktop 106, or as a virtualized instance on the remote desktop 106. The tunneling service agent proxies polling requests and updated documents generally meant for the remote desktop 106 through a remote instance of the VDI client. The VDI client can then provide all the mirroring commands, documents or software, and updates to the documents back to the client device 104, performing the various functions, and therefore the place of, the remote desktop 106, in some embodiments. Such a solution frees the remote desktop 106 to also provide content to the VDI agent that separately be mirrored to the client device 104, or which can be combined with the VDI-agent mirrored documents/software on the client device 104.

Figure 5:
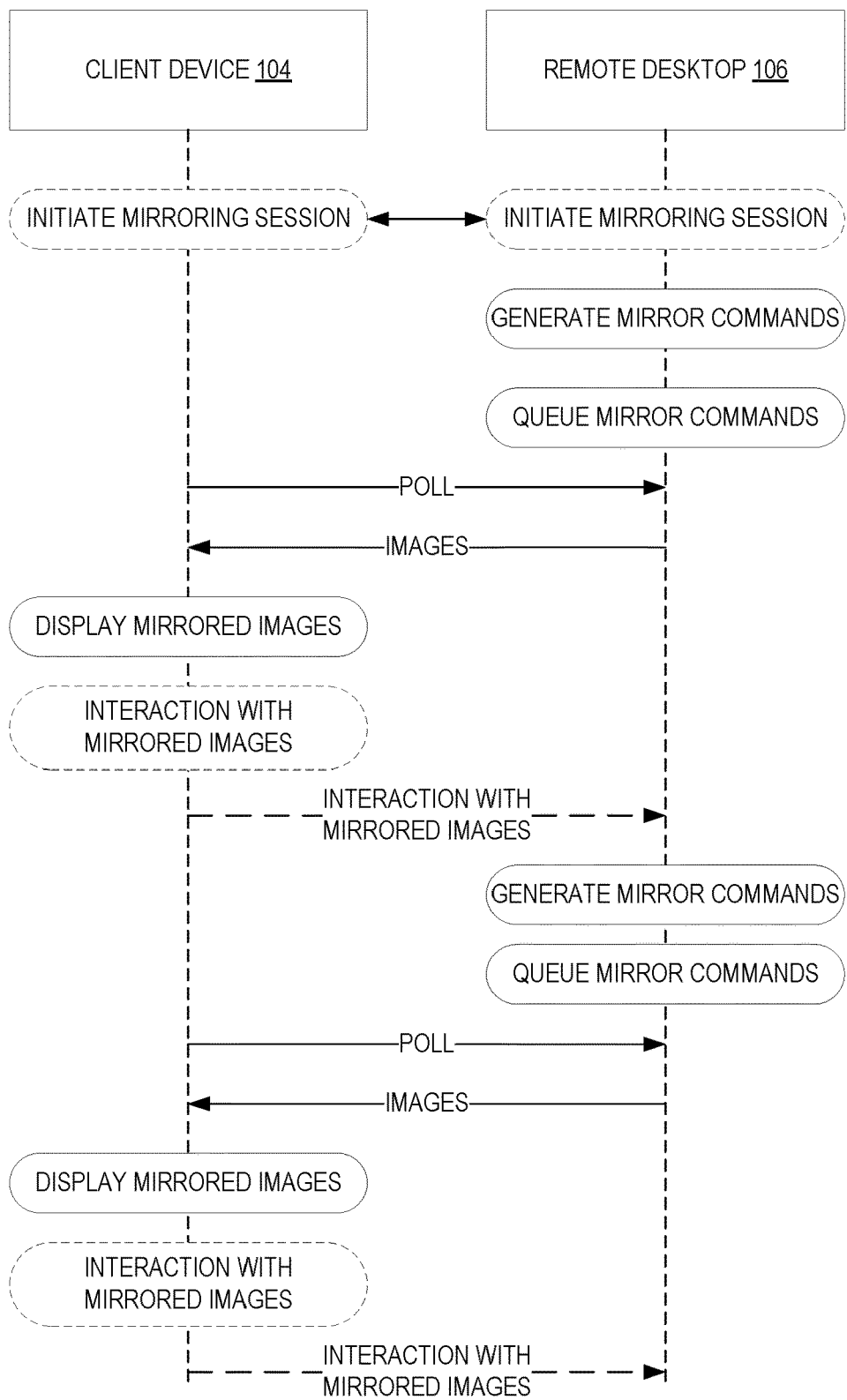
FIG. 5 illustrates a sequence diagram illustrating the interaction between the remote desktop and the client device during document mirroring.

FIG. 5 is a sequence diagram illustrating the interaction between the remote desktop and the client device during document mirroring. In the example of FIG. 5, the mirroring session is initiated at either the remote desktop 106 or the client device 104. The remote desktop 106 generates mirror commands, and queues them in the command queue 800. The client device 104 polls the remote desktop 106, and retrieves the document and associated pointers for any item, such as a document, a program, a file, an application, etc. to be mirrored. The client device 104 displays the mirrored document. In some examples, such as bi-directional mirroring, the client device 104 permits interaction with the mirrored documents. In that example, the interaction with the mirrored documents is mirrored back to the remote desktop 106 by the client device 104. The process continues, with the remote desktop 106 continuing to generate and queue commands, which are polled, retrieved and displayed by the client device 104, until the mirroring session terminates.

FIGS. 6-9 illustrate various UIs of different mirroring and authentication techniques disclosed herein, according to one or more embodiments. Looking at FIG. 6, a UI screen on the remote desktop 106 is shown providing options for a user to select one or more registered client devices 104 (e.g., an iPad Mini and an iPad Air) for mirroring the selected PDF (iPadPro.pdf) document. In an embodiment, the user may opt to choose which client device 104 should receive a particular mirrored document (in the example of FIG. 6, two client devices 104 "Hao's Tablet" and "Jack's Tablet" are available). Alternative embodiments automatically mirror documents being opened to preselected client devices 104.

Figure 6:
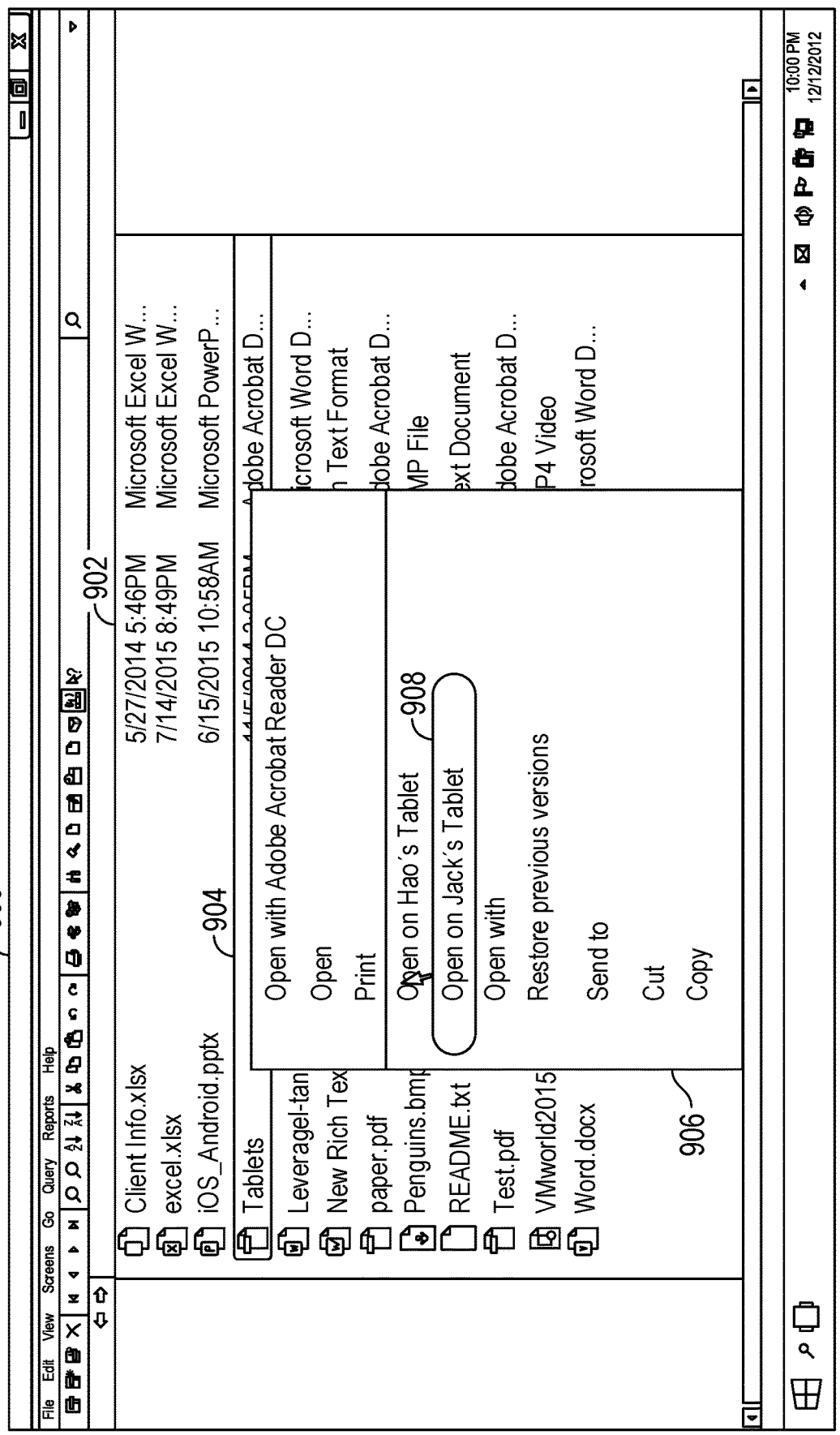
FIGS. 6-9 illustrate various user interfaces (UIs) of different mirroring techniques.

As illustrated in FIG. 6, multiple mobile devices may be registered to receive mirrored documents from a single desktop, e.g., in a one-to-many configuration. Additionally or alternatively, certain registered devices may display particular types of documents. For example, one registered tablet may receive all mirrored spreadsheets, a registered smart phone may receive all mirrored videos and images, and a second mobile tablet may receive all text documents. In one-to-one sharing, opened documents may be mirrored directly to a solely registered mobile device or selectively to one of several registered devices chosen based on user preferences (e.g., work versus personal mobile device), proximity to the user, or other user-based events. Proximity to the user may be determined through global positioning system (GPS) detection, cellular triangulation, low-energy communication, latest mobile device the user accessed, historically used mobile device at a particular time or day (e.g., whether the user has previously used their work tablet between particular hours that the document needs to be mirrored), or the like.

While FIG. 6 shows options for the user to elect to open desktop documents on a mobile tablet, alternative embodiments automatically mirror documents using the techniques described herein without any sort of user interaction. For example, a user working on a PDF file on their desktop may simply leave their desktop, pick up a mobile tablet, and continue working on the PDF on their mobile tablet—all while having the PDF being mirrored between the tablet and desktop. When the user returns to the desktop and opts to continue working thereon, the user may put down the tablet and continue working on the PDF, with the latest version of the PDF being mirrored to the desktop, including all changes made on the tablet.

Figure 7:
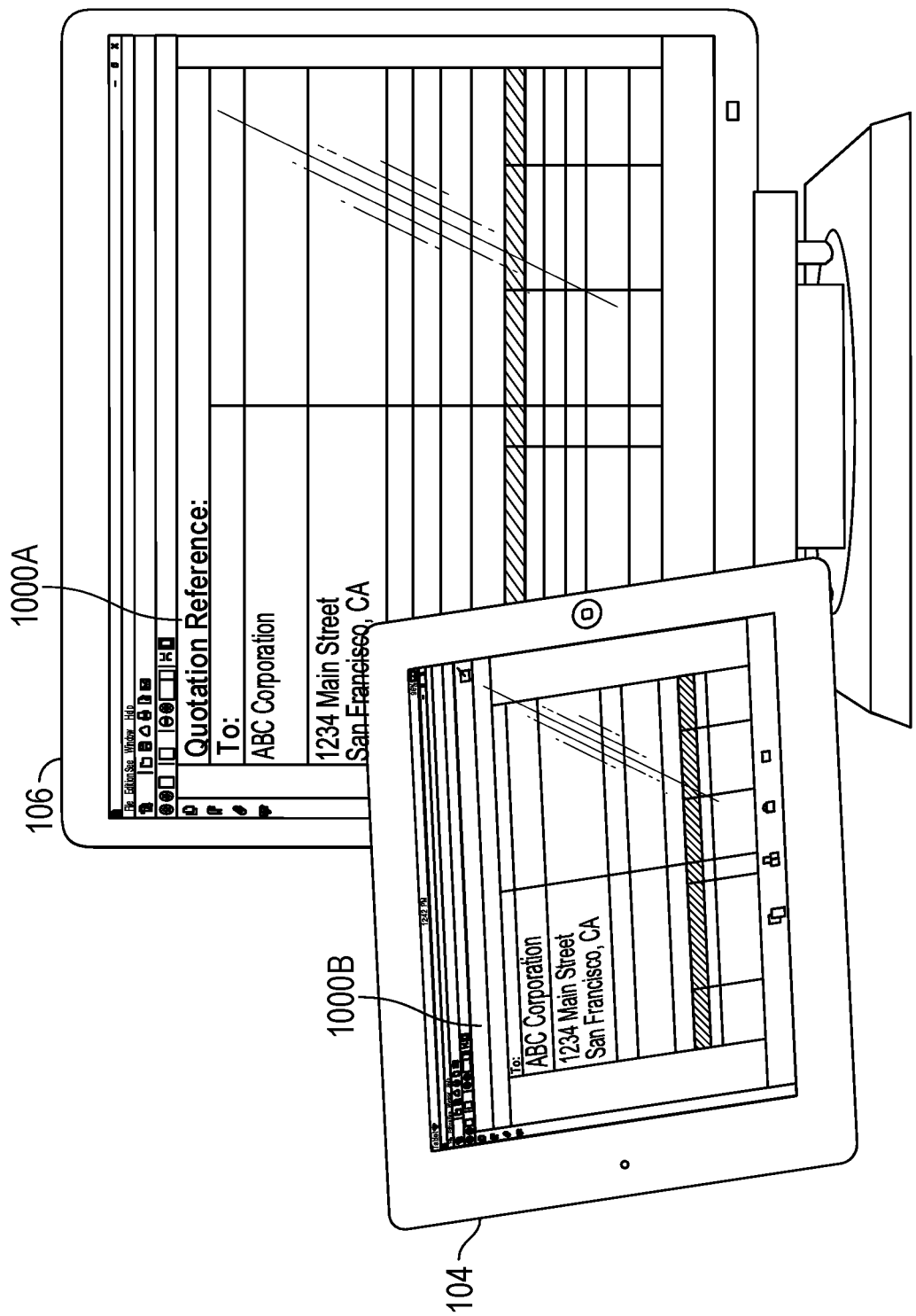

FIG. 7 illustrates a document opened on a remote desktop 106 (the personal computer) being mirrored on a client device 104 (the mobile tablet). The mirrored document appears in its own reading pane within a client application on the client device 104. An embodiment uses an object linking and embedding "custom dynamic link library (DLL) interception mode" in which documents generated within applications of the remote desktop 106 are automatically mirrored to registered mobile devices even before the documents are saved within the source remote desktop 106 application. For example, a text document that is opened from an e-mail may be mirrored to the client device 104 using the custom DLL interceptor before the text document is actually saved by a user on the remote desktop 106. Such automatic mirroring aligns with the "zero-friction" of the disclosed embodiments by eliminating the need for the user to first save the generated document in the source application before being able to view it on the client device 104. DLL interception also applies to the traditional file/open command pathway within common applications such as the MICROSOFT OFFICE®-branded suite of products, with the requested document opening both in the remote desktop 106 application and instantly on the client device 104.

In some embodiments, interception DLLs are loaded and injected into key applications, such text editors, spreadsheet programs, and browsers, that triggered special actions whenever new files are opened or created within a desktop application. In one implementation, an "AppMirror" DLL is loaded using a master "Shimloader" DLL, which has a whitelist of applications including Microsoft WORD®-branded text editor that it checks for whenever a new process is launched on the OS of the remote desktop 106. AppMirror will make its RPC call to a special OS service that then generates commands in a queue that the client polls for and acts upon to start mirroring.

Figure 8:
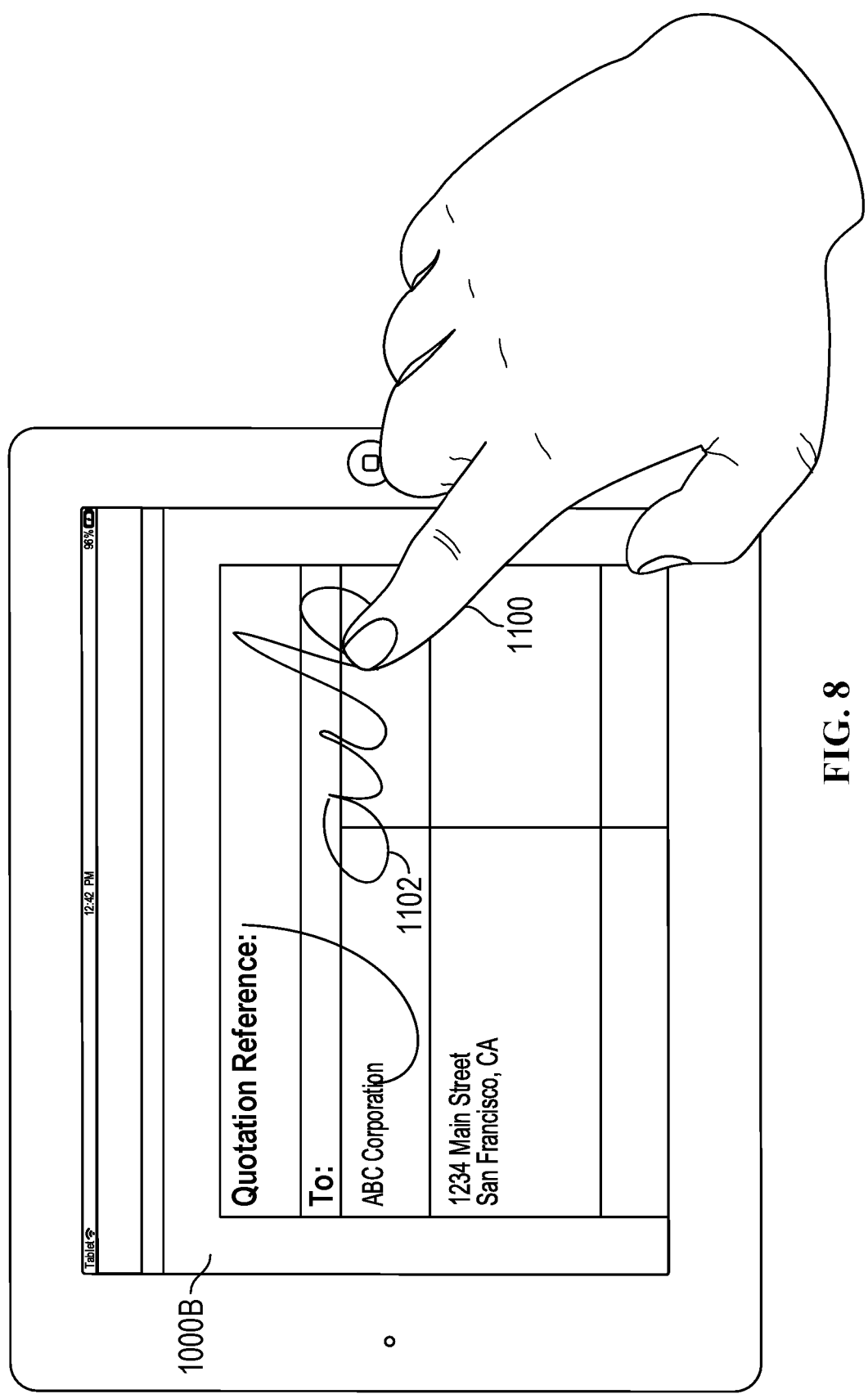

FIG. 8 illustrates a user editing a mirrored PDF on a client device 104. Although in the example of FIG. 8 the client device 104 is a tablet, the client device 104 is any mobile device. Mobile devices include (but are not limited to) smart watches, smart phones, mobile tablets, touch screen devices, and the like.

Figure 9:
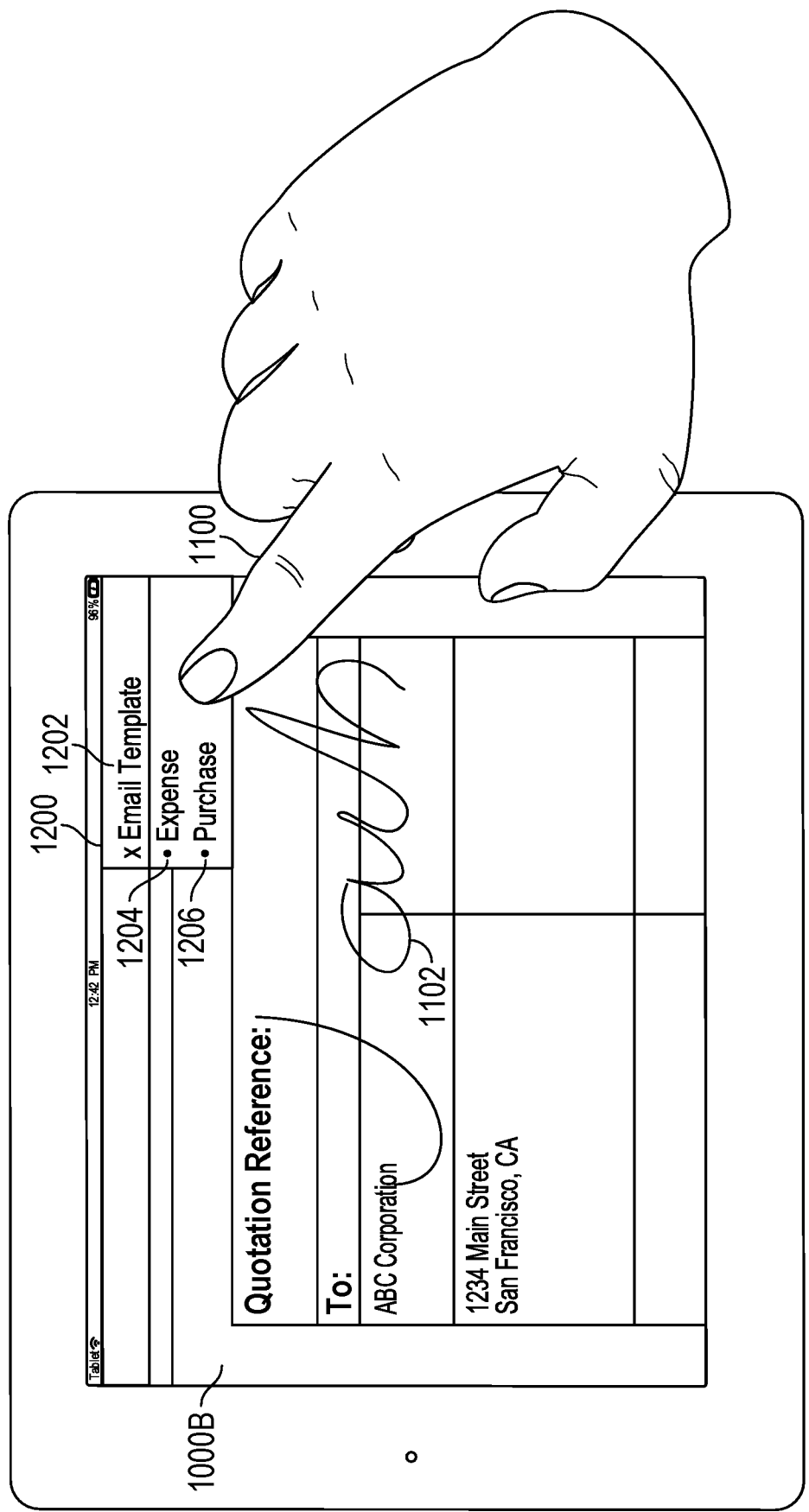

FIG. 9 illustrates the user opting to attach the mirrored document to a template e-mail message.

Figure 10:
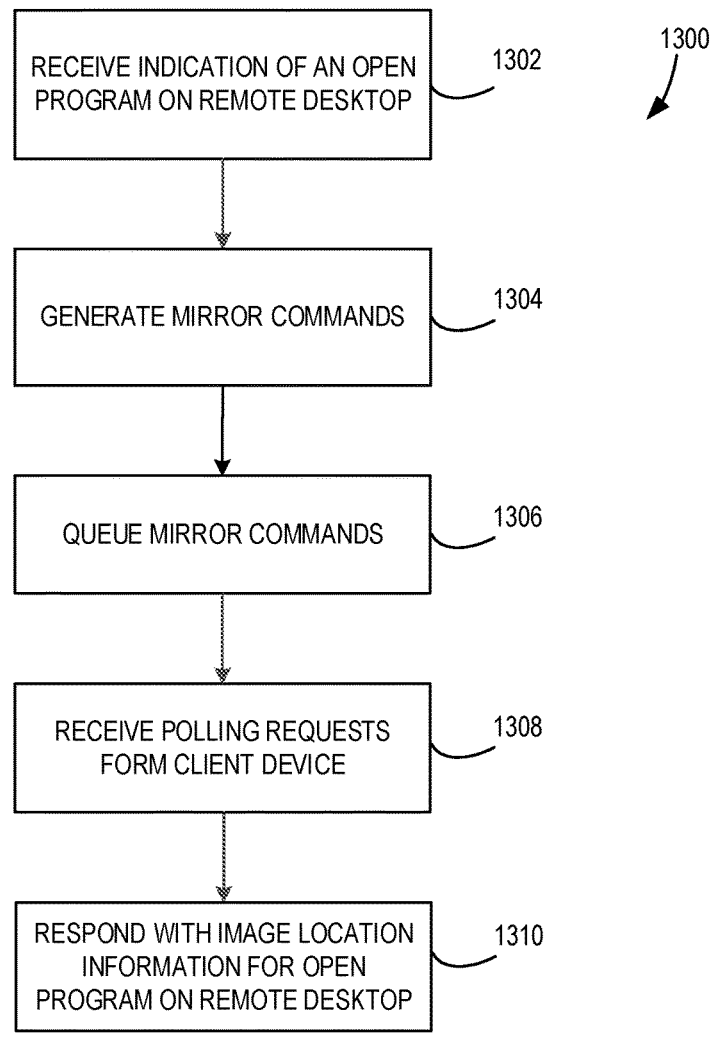
FIG. 10 illustrates a flow chart diagram illustrating a work flow for mirroring a document from the perspective of the remote desktop.

FIG. 10 is an example flow chart diagram illustrating a work flow 1300 for mirroring a document, from the perspective of the remote desktop. An indication of an open program or other desktop service on a remote desktop 106 to be mirrored to a client device 104 is received, at shown at block 1302. While in the example of FIG. 10 a program is mirrored, in some examples a specific document selected from an assortment of documents is mirrored, a specific application is mirrored, and the like. In some examples, the indication that the open program should be mirrored is generated at the remote desktop 106. Alternatively, the indication is generated at the client device 104 (not illustrated). The indication is generated in a variety of ways. For example, a user requests that the document be mirrored, the program prompts a user to mirror the document, a client device 104 prompts the user to mirror the document, the remote desktop detects the user has left (e.g., through sensors, cameras, inactivity, or the like) and the like. In other examples, certain documents, applications, programs, etc. are flagged, tagged, or otherwise identified as "always mirrored." In that example, opening the flagged or tagged document will automatically begin mirroring. In some examples, desktop services (e.g. documents, files, applications, etc.) are mirrored automatically, without any user interaction. In some examples, each time a desktop service of a particular or designated type is opened a mirroring session is established. As an example, every time a PowerPoint presentation is opened, mirroring automatically beings to a designated client device 104. In this manner, a user is seamlessly able to initiate a presentation at a remote desktop 106, while manipulating it on a client device 104.

Mirror commands are generated at 1304. In some examples, the proxy services agent 110 operating on the remote desktop 106 receives service requests for mirroring specific documents opened on the remote desktop 106. The proxy services agent 110 performs the requested services, optionally, by performing system calls to the operating system running on remote desktop 106. Alternatively, applications running on the remote desktop 106 may also be queried to perform the services.

A result set gathered by the proxy service agent 110 is then returned to the client device 104, in some examples as part of the command queue 800 at 1306. The type of result set may depend on the service performed. For example, proxy services agent 110 may use file explorer service agent 812-1 to output a list or locations of files. In that example, a command queue 800 stores the result set, the list, or the other data for retrieval by the client device 104. The command queue 800 includes, as an example, instructions to mirror the opened document and one or more pointers to the opened document.

Polling requests are received from the client device 104, as shown at block 1308. In response to polling from the desktop agent 108 of the client device 104, the remote desktop 106 exposes the commands in the command queue 800. In response to the polling requests, locations of the opened program on the remote desktop 106 are provided to the client device 104, as shown at block 1310. The file explorer service agent 112-1 either provides the pointer location to the opened file, allowing the desktop agent 108 of the client device 104 to retrieve the documents and display the mirrored opened document or file on the client device 104, or alternatively, the file explorer service agent 112-1 pulls and provides the documents to the desktop agent 108 of the client device 104 as a result set transmitted via the data transmitter 402. The documents can then be retrieved by the client device. In some examples, the remote desktop 106 actively broadcasts the generated commands to the client device 104. In this example, the client device 104 need not poll the remote desktop 106 for pending commands.

Figure 11:
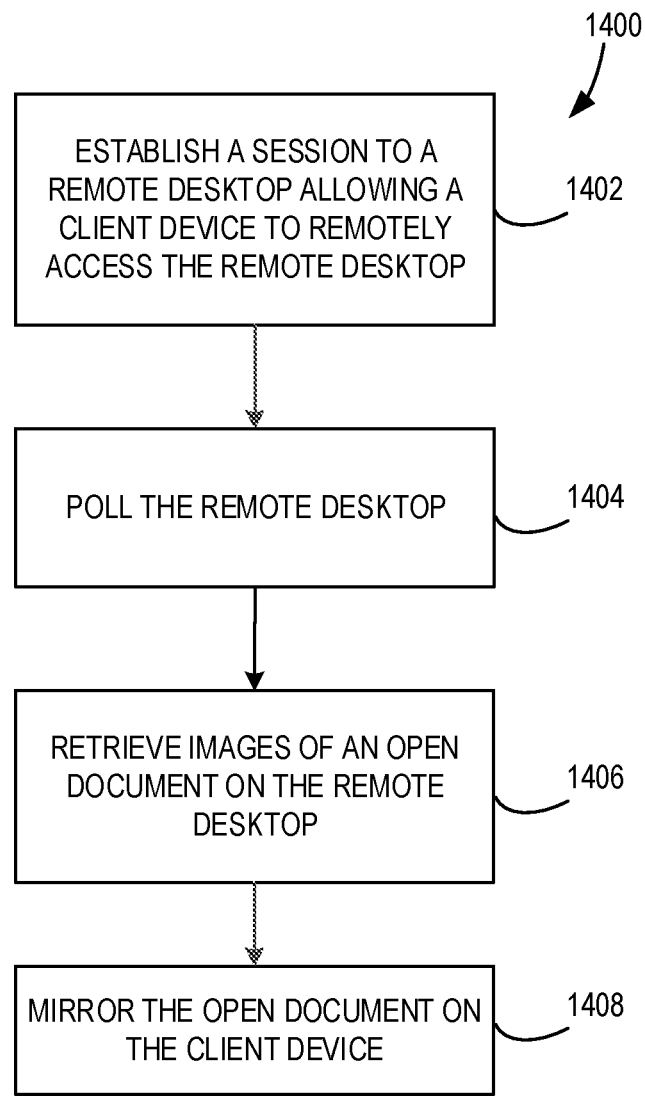
FIG. 11 illustrates a flow chart diagram illustrating a work flow for mirroring a document from the perspective of the client device.

FIG. 11 is an example flow chart diagram illustrating a work flow 1400 for mirroring an open and user-selected program on a remote desktop. Initially, a session is established between a remote desktop 106 determined for a user of a client device 104 and a client device 104, as shown at block 1402. The session allows the client device 104 to remotely access the remote desktop 106 to have an open document, file, application, program, and the like on the remote desktop 106 mirrored onto the client device 104. The remote desktop 106 is polled, as indicated at block 1404, to request queued mirror commands related to the one or more desktop services being opened on the remote desktop 106.

The client device 104, in some embodiments, downloads, retrieves, or otherwise receives from the remote desktop 106 a desktop service such as a file, document, program, etc. for consumption at the client device 104. In that case, instead of maintaining communication between the client device 104 and the remote desktop 106, the mirroring session is terminated after an accurate and complete copy of the appropriate desktop service is established on the client device 104. The mirrored desktop service is consumed, edited, or otherwise used on the client device 104, without regard to continued mirroring in either direction.

Figure 12:
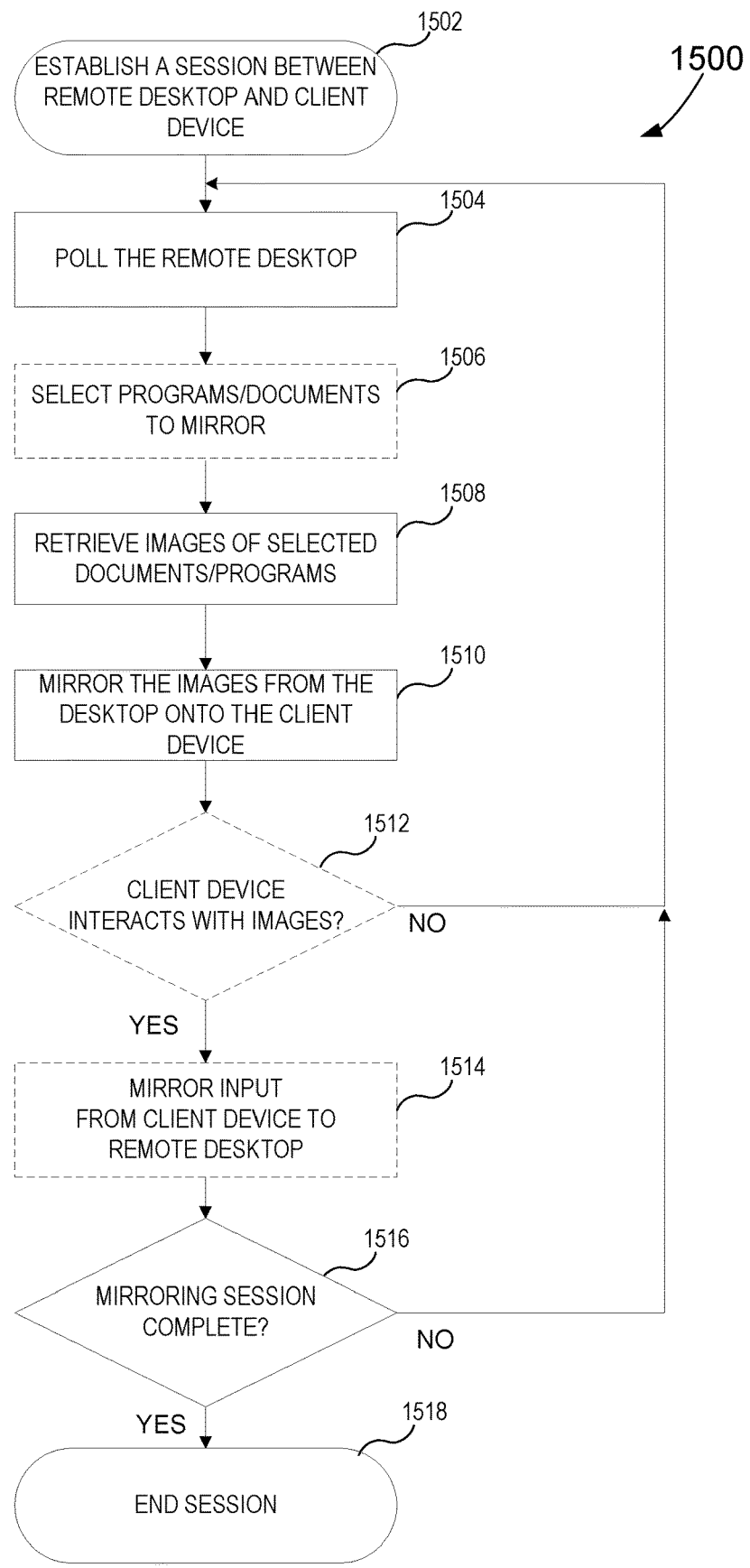
FIG. 12 illustrates a flow chart diagram illustrating a work flow for bi-directional mirroring of a document.

FIG. 12 is a flow chart diagram illustrating a work flow for bi-directional mirroring of a document. In the example of FIG. 12, a session is established between the remote desktop 106 and the client device 104 at 1502. At 1504, the client device 104 polls the remote desktop 106. An initial poll of the remote desktop 106 reveals, in some examples, documents, applications, programs, etc. available for mirroring. In those examples, the client device 104 indicates to the remote desktop which item is selected for mirroring at 1506. Alternatively, a command generated at the remote desktop 106 identifies which item is mirrored.

In the bi-directional embodiment, the desktop agent 108 mirrors the edits made by the user back to the remote desktop 106 at 1514. The desktop agent tracks and marks mirrored documents according to user edits, inputs, stylus touches on a touch screen of the client device 104, and the like. For example, a word document may be mirrored on the client device 104, and a user may edit the mirrored document using the pop-up keyboard on a client device 104 screen. The client device 104 may be configured to automatically—or upon user command—transmit the edited document to the remote desktop 106. Commands generated by the client device 104 in the bi-directional embodiment are executed by the remote desktop 106.

At 1516, if the mirroring session is terminated at either the client device 104 or the remote desktop 106, then the session is ended at 1518. Otherwise, the client device 104 continues to poll the command queue 800 for additional mirroring commands. In some embodiments, the client device 104 also continues to return commands to the remote desktop 106, if bi-directional mirroring is utilized.

In some examples, the client device 104 or the remoted desktop 106 detect a change to the document which was not made in response to a user command or interaction generated at the client device 104. As an example, in a collaborative document the remote desktop 106 generates and queues an instruction for retrieval by the client device 104; that instruction originates with another collaborator (e.g., not the user). A notification is transmitted to the client device 104 that a change is made, which did not generate with the user, upon detecting that change.

In some examples, a helper application operates on the client device 104. The helper application permits the client device 104 to receive from the remote desktop 106 one or more elements of a workflow task initiated on the remote desktop 106. The helper application executes the elements, and returns the result to the remote desktop 106. In this manner, the remote desktop 106 leverages computation resources of the client device 104. As an example, a client device 104 with available computational resources receives one or more elements of a workflow relating to computations performed on the remote desktop 106. The helper application manages the execution of the operations necessary to complete the computations, and returns the result to the remote desktop 106.

In examples of bi-directional mirroring, priority is established as to which commands are executed first, those originating at the client device 104 or those originating with the remote desktop 106. In some examples, commands from the remote desktop 106 are given priority. Alternatively, the commands originating at the client device 104 are prioritized. In either example, a user/administrator establishes the priority, and federates it in some examples by way of a policy, procedure, protocol, and the like.

Figure 13:
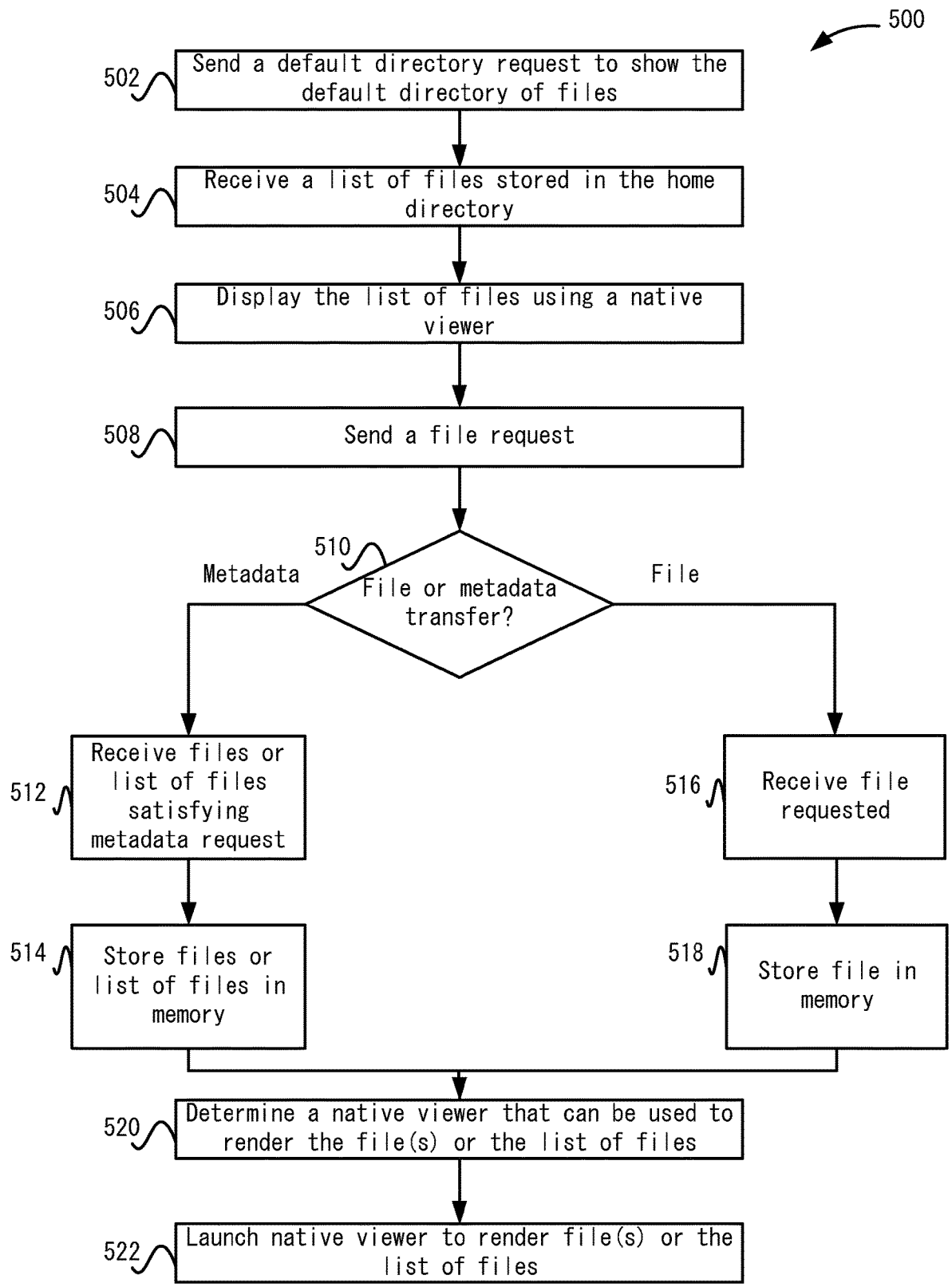
FIG. 13 illustrates a flowchart of a work flow for processing file service requests.

In a file explorer example, a file system may be accessed using remote desktop 106. FIG. 13 depicts a simplified flowchart 500 of a method for processing file service requests according to an embodiment. In one example, a special handler/service is provided by file explorer service agent 112-1 to handle incoming file service requests. File explorer service agent 112-1 may be a micro HTTP protocol handler on a configurable port that provides HTTP file explorer remoting application programmer interfaces (APIs) for mobile devices. In one example, a connection is opened on a file handler port on client device 104 to have file service requests performed using the APIs.

At 502, client device 104 sends a default directory request to show the default directory (e.g., a home directory) of files. The default directory may also be configurable by each user or an administrator. At 504, client 104 receives a list of files stored in the home directory. For example, file explorer service agent 112-1 may send a request to remote desktop 106 to retrieve the list of files in the home directory. The "list of files" may include file names and/or folder names for files and folders in the directory. The list of files is returned as the result set to client 104.

At 506, client device 104 displays the list of files using native viewer 206. For example, the native file viewer application on client device 104 may be used to display the list of files. The user may then review the file list, navigate to other folders using additional directory requests, and perform a file request. At 508, client 104 generates and sends the file request. Different file requests may be sent, such as a metadata request or a file transfer request. File transfer requests are requests for file contents and metadata requests return information describing data about files that are stored at remote desktop 106. Examples of metadata requests include requests such as "GetAllFiles" for a default folder (e.g., a "My Documents" folder in Windows), which retrieves a list of files stored in the folder. Additional requests may also be supported, such as "recentlyUsedFiles," "searchFilesInAFolder," and "emailFiles." These requests retrieve recently used files, search for files in a folder, or email certain files.

At 510, it is determined whether the request is for a file transfer or a metadata transfer. If the request is a metadata request, at 512, client device 104 receives requested file information or list of files. At 514, the file information or list of files is stored in memory 204. If the request is a file transfer request, at 516, client 104 receives at least a portion of the contents of the file or files requested. For example, the file contents may be sent in chunks or pages. At 518, the file contents are stored in memory 204. The result set for either type of request may also contain metadata information about the files retrieved, such as "isFileAFolder," "lastModified Timestamp," "fileSize," and "fileACL" metadata. The "isFileAFolder" metadata indicates whether the file is a folder, the "lastModified Timestamp" metadata indicates the time when the file was last modified, the "fileSize" metadata indicates the size of the file, and the "fileACL" metadata indicates the access rights to the file.

Whether the request was a metadata request or a file transfer request, at 520, native viewer selector 208 determines a native viewer 206 that can be used to render the requested information pertaining to the file(s) or list of files or contents. At 522, native viewer launcher 210 launches native viewer 206 to render the file(s) or list of files.

Some particular embodiments use native viewer 206 to display result sets from service requests. Using native viewer 206 leverages the form factor and ergonomics of client device 104. For example, if client device 104 has a small mobile phone form factor, a complete desktop folder view may not be intuitive for the user. Additionally, converting touch events to mouse/keyboard events may not work correctly on mobile phones with small screen resolutions. Using native viewer 206 allows those touch events to be used without translation to mouse/keyboard events. Additionally, the features of native viewers 206 may now be leveraged. For example, features such as zoom in, pan, and rotate on locally-rendered native viewers 206 for different file formats may be leveraged.

While file viewing has been described, file editing is also possible where the changes may be pushed back to remote desktop 106. In this case, changes may be sent back to remote desktop 106. The edits may be stored in the files at remote desktop 106. Different techniques may be used to store the changes, such as a binary "diff" of files to push back only changes in a file.

Figure 14:
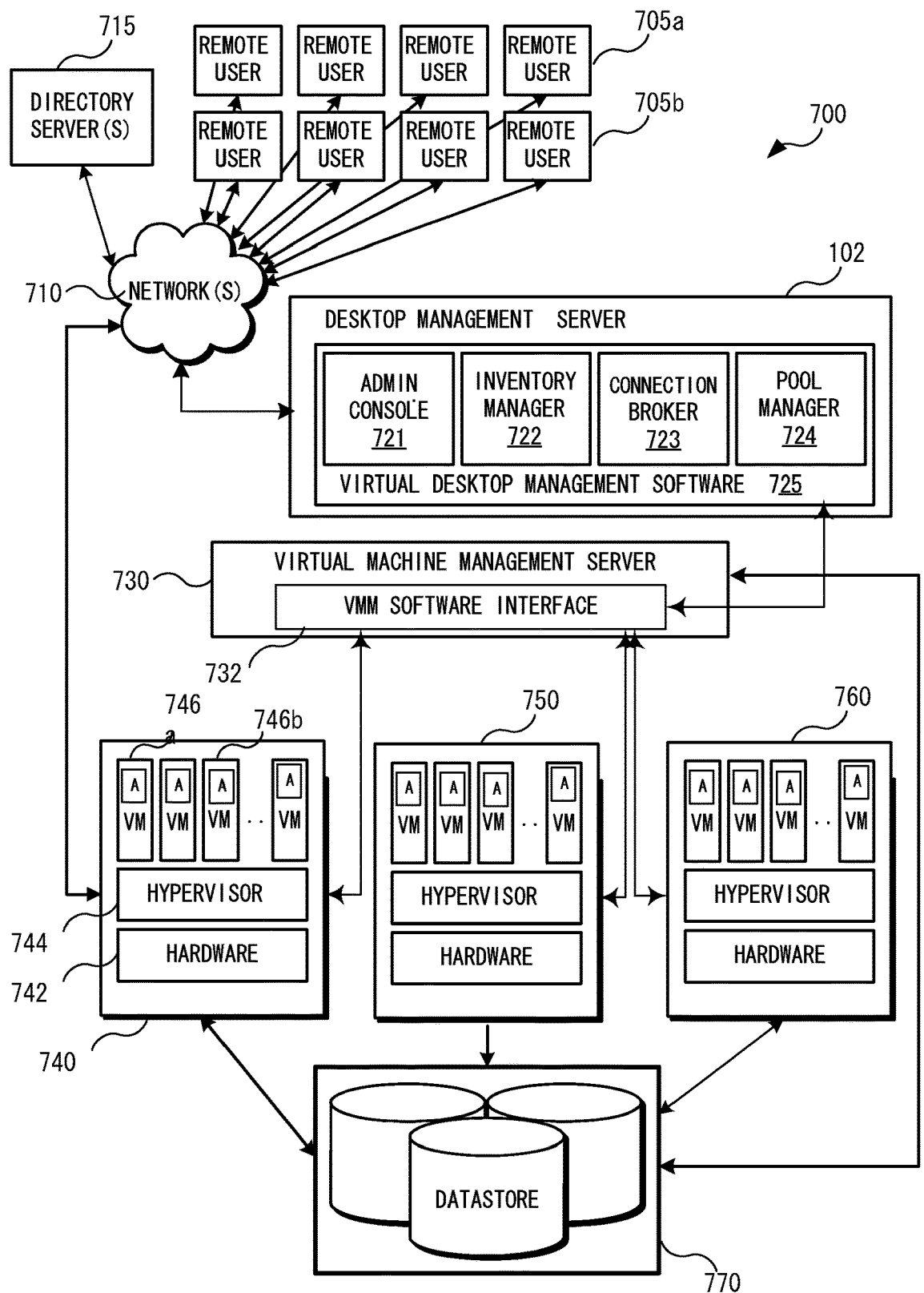
FIG. 14 illustrates a block diagram of an example general virtualized machine architecture environment.

FIG. 14 is a block diagram of an example general virtual desktop infrastructure (VDI) environment for executing example embodiments. The following architecture may be used in a remote desktop session and may be enhanced to use the client services interface to have services performed and return result sets for display using native viewers 206. As shown in FIG. 14, in traditional use, remote users, for example users 705a and 705b, may access centrally-managed remote desktops 106, such as those implemented by virtual machines 746 running in a datacenter, using network 710 (e.g., a local area network, or other private or publically accessible wide area network, such as the Internet) through any number of different types of devices. These virtual machines (VMs) 746 are complete computation environments, containing virtual equivalents of the hardware and system software components of a physical system as described above, and are typically implemented by an extensive virtualization infrastructure, which includes a variety of software and hardware components.

Remote access to remote desktops is generally provided to client devices through a desktop management server 102. Desktop management server 102 provides access to remote desktops by the remote user devices, and manages the corresponding virtual machines through communications with a software interface 732 of a Virtual Machine Management Server (VMMS) 730. The Virtual Machine Management Server (VMMS) 730 is responsible for provisioning and maintaining the multitude of Virtual Machines (VMs) 746 implemented across potentially a multitude of physical computers, such as computers 740, 750, and 760.

When a user wishes to access an existing virtual machine, the user establishes a connection through the desktop management server 102, and a remote desktop is presented (as a user interface) on the user's client device, through which communications are made with the underlying virtual machine. Additionally, the virtual machine may include a proxy services agent 110 as described above with reference to FIG. 1 to perform service requests.

In the example embodiment shown, each physical computer, for example computer 740 contains the underlying hardware 742, virtualization software (here a hypervisor 744), and one or more virtual machines, for example VM 746a and VM 746b, which each contain Agent Software (guest system software) labeled here as "A" in each VM box. The Agent Software is typically responsible for connecting each VM to the desktop management server 102 and manages each desktop connection. It typically notifies the desktop management server 102 upon each login, logoff, and disconnect. The Agent Software also provides support for remote devices such as universal serial bus (USB) devices, etc. The Agent Software may also be enhanced to include proxy services agent 110 and service plug-ins 112.

The VMMS 730 typically manages pools of compute resources used to run virtual machines on a set of clusters typically containing multiple servers with CPUs, memory, and communications hardware (network). A virtual computer (a virtual machine or VM), when active, consumes physical compute resources and is managed by a hypervisor layer, such as hypervisor 744 running on physical computer 740. The hypervisor manages physical resources as well as maintains virtual-to-physical hardware mappings. The Software Interface 732 running on the VMMS 730 communicates with these hypervisors (e.g., hypervisor 744) to provision and manage each VM 746. For example, according to traditional virtualization techniques, when a remote user (e.g., user 705a) requests access to a particular existing desktop, the desktop management server 102 (through its software 725) communicates with the VMMS through its software interface 732 to start the corresponding VM 746 executing on an appropriate physical computer and relay the user interface exported by the VM 746 to the remote user so that the user can interact with the remote desktop. In some instances, (e.g., according to administrator policies), when the desktop is exited, or otherwise shutdown, the desktop management server 102 communicates with the VMMS 730 to save the VM image to the datastore 770 as appropriate and to de-allocate physical and VM system resources as needed.

In general, the VMMS Server 730 provides interfaces 732 to enable other programs, such as the Pool Manager 724, to control the lifecycle of the various virtual machines that run on a hypervisor. In one example embodiment of an existing virtualization infrastructure provided by VMware Inc., desktop management server 102 includes an Administrative Console 721, an Inventory Manager 722, a Connection Broker 723, and a Pool Manager 724. The Connection Broker 723 allows a remote user, such as remote user 705a, through client device 104, to initiate a desktop session with an assigned VM 746 or to access an existing connection to VM 746. Connection Broker 723 may also be enhanced to include remote desktop gateway 302.

The Inventory Manager 722 maintains a mapping of different user belongings in the system. For example, user may be entitled to certain applications; may have access to more than one desktop, etc. The Inventory Manager 722 also keeps track of the running remote desktops in the system. The mappings may be stored using any number of mechanisms, including using one or more directory servers 715 accessible through network 710.

The Pool Manager 724 component manages the complete lifecycle of remote desktops. Desktops in a pool are grouped together based on similar software requirements. Desktop Administrators create logical desktops groups (desktop pools) that are provisioned typically from the same base image, including the Agent Software. For example, a desktop pool may include virtual machines that run the same set of software applications and run the same operating system. As yet another example, a desktop pool may contain a set of cloned virtual machines that are identical in every aspect but are customized to include unique identity that includes for example, a unique computer name, IP/MAC Address, Domain membership, Software license serial numbers, OS specific security identifiers among other things. The base image can be a virtual machine or a template virtual machine that is created and/or managed by the VMMS 730.

The software state of all the virtual machines 746 in a desktop pool may be persistent or non-persistent. Persistent desktops maintain the state of the files or applications stored inside the virtual machines. Non-Persistent desktops are stateless desktops; the desktop state is restored to the original state after every user session. In some cases, the Desktop Administrator can define how frequently the "revert to golden state" operation should be performed. The restore to pristine image or revert to golden state operation can also be scheduled to occur based on certain conditions.

The Administrative Console 721 typically provides a user interface for a Desktop Administrator to manage the configuration of desktop pools, define user access policies, manage ongoing maintenance, software installed in the desktops, etc.

The Directory Server 715 stores the persistent state required for managing the remote desktops. For example, the VMs in a desktop pool may be associated with one or more users. The user identifiers for a pool may be stored in the directory server 715. The users may also be referenced through an external directory server such as MICROSOFT Active Directory, NOVELL eDirectory, IBM Tivoli Directory Server, etc.

The illustrated virtualization architecture is shown using a hypervisor-centric model. Alternative embodiments may control some or all of the VMs 746 in a virtualization architecture that uses containers instead of hypervisors. Yet, other embodiments may manage the depicted VM environment with unikernels. Thus, the illustrated virtualization architecture is but only one configuration for implementing the various embodiments disclosed herein.

Embodiments are not limited to being executed in virtualized environments, however. The disclosed embodiments may be run simply between desktop, server, and client mobile devices in a public or private network environment.

In some examples, executable instructions are stored in a memory. Memory is any device allowing information, such as executable instructions and/or other data, to be stored and retrieved. For example, memory may include one or more random access memory (RAM) modules, flash memory modules, hard disks, solid state disks, and/or optical disks.

Figure 15:
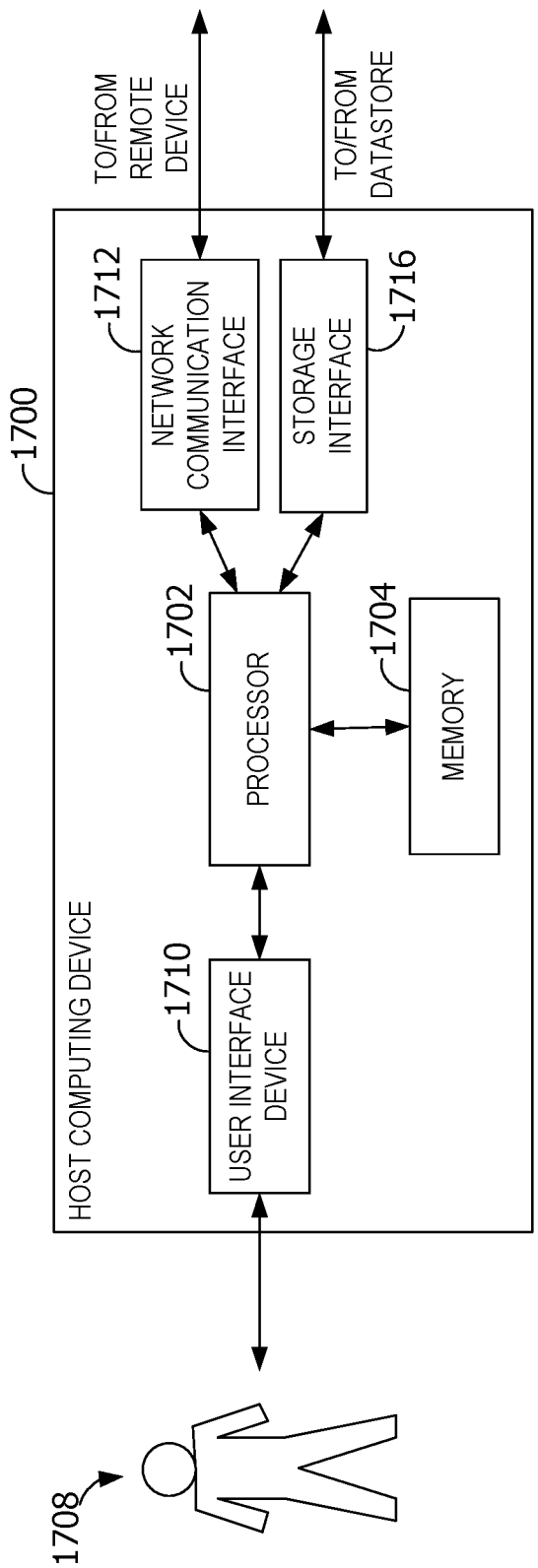
FIG. 15 is an example block diagram of a host computing device.

FIG. 15 is a block diagram of an example host computing device 1700. Host computing device 1700 includes a processor 1702 for executing instructions. In some examples, executable instructions are stored in a memory 1704. Memory 1704 is any device allowing information, such as executable instructions and/or other data, to be stored and retrieved. For example, memory 1704 may include one or more random access memory (RAM) modules, flash memory modules, hard disks, solid state disks, and/or optical disks.

Host computing device 1700 may include a user interface device 1710 for receiving data from a user 1708 and/or for presenting data to user 1708. User 1708 may interact indirectly with host computing device 1700 via another computing device such as a device running VMware's vCenter Server™-branded software or other management device. User interface device 1710 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 1710 operates to receive data from user 1708, while another device (e.g., a presentation device) operates to present data to user 1708. In other examples, user interface device 1710 has a single component, such as a touch screen, that functions to both output data to user 1708 and receive data from user 1708. In such examples, user interface device 1710 operates as a presentation device for presenting information to user 1708. In such examples, user interface device 1710 represents any component capable of conveying information to user 1708. For example, user interface device 1710 may include, without limitation, a display device (e.g., a liquid crystal display (LCD), organic light emitting diode (OLED) display, or "electronic ink" display) and/or an audio output device (e.g., a speaker or headphones). In some examples, user interface device 1710 includes an output adapter, such as a video adapter and/or an audio adapter. An output adapter is operatively coupled to processor 1702 and configured to be operatively coupled to an output device, such as a display device or an audio output device.

Host computing device 1700 also includes a network communication interface 1712, which enables host computing device 1700 to communicate with a remote device (e.g., another computing device) via a communication medium, such as a wired or wireless packet network. For example, host computing device 1700 may transmit and/or receive data via network communication interface 1712. User interface device 1710 and/or network communication interface 1712 may be referred to collectively as an input interface and may be configured to receive information from user 1708.

Host computing device 1700 further includes a storage interface 1716 that enables host computing device 1700 to communicate with one or more data storage devices, which store virtual disk images, software applications, and/or any other data suitable for use with the methods described herein. In example examples, storage interface 1716 couples host computing device 1700 to a storage area network (SAN) (e.g., a Fibre Channel network) and/or to a network attached storage (NAS) system (e.g., via a packet network). The storage interface 1716 may be integrated with network communication interface 1712.

Additional Embodiments

In some embodiments, a system includes a desktop agent that cooperates with a mobile agent to provide a range of augmented services to desktop users, allowing the mobile device to function as an extension of the desktop for designated tasks. Alternatively or in addition to the preceding embodiments, the multiple helper devices are registered simultaneously to the desktop for purposes of serving as augmentations to user productivity or enhancements to user experience. In some examples, a user can authenticate to a remote desktop 106 session using the touch-ID capability of a mobile device such as an APPLE® brand device such as an IPAD®-brand tablet or IPHONE®-brand mobile phone, or wearable watch. In some examples, a user may lock or unlock the desktop's screen using touch-ID.

Alternatively or in addition to the preceding embodiments, documents launched on the desktop are automatically mirrored to a mobile device for viewing on that device. In some embodiments, documents can be directly launched on a mobile device from the desktop using the format 'Open Document on Device' where 'Device' is the name of a target mobile device.

Alternatively or in addition to the preceding embodiments, specific document types are designated for automatic mirroring on specific target device allowing direct routing of documents launched on the desktop to target devices based on document type.

Alternatively or in addition to the preceding embodiments, a document launched on the desktop may be mirrored directly to multiple devices simultaneously.

Alternatively or in addition to the preceding embodiments, a mirror document may be signed using a finger or stylus on the touch screen device for a resulting PDF containing the resulting document with applied signature. Alternatively or in addition to the preceding embodiments, the signed document is saved back directly to a designated folder in the desktop's file system with the original file name plus an appended suffix such as "_signed."

Alternatively or in addition to the preceding embodiments, the signed document is sent to a desktop email program for attachment into an email.

Alternatively or in addition to the preceding embodiments, the signed document may be generated from a designated email template such as a Microsoft Outlook Template which results in a preformatted email with the signed document attached.

Alternatively or in addition to the preceding embodiments, a designated application window is mirrored to a mobile device such that a selected area of the desktop is visible on a designated mobile device for the purposes of viewing a discreet portion of the source desktop.

Alternatively or in addition to the preceding embodiments, the selected screen portion is exported to the mobile device and remains visible when the source desktop is locked for security reasons or in screen-saver mode.

Alternatively or in addition to the preceding embodiments, the selected screen portion is mirrored to multiple devices simultaneously.

Alternatively or in addition to the preceding embodiments, a timestamp is applied to the exported window visible on the mobile device upon the closure of the source window exported from the desktop.

Alternatively or in addition to the preceding embodiments, the selected portion of the source desktop is exported to a wearable device such as a digital watch.

An embodiment is directed to a method comprising a helper application running on a remote device connecting to a remote desktop for the purpose of enhancing the desktop user's productivity by augmentation of workflow elements for tasks initiated on the desktop, continued on the mobile device, and completed on the desktop.

Alternatively or in addition to the preceding embodiments, document signing is initiated on the desktop by launching a document, continued on a mobile device by signing on a touch screen, and completed on the desktop by saving the signed document or emailing same.

Alternatively or in addition to the preceding embodiments, a portion of the desktop screen is exported to a mobile device for discreet viewing, when the desktop screen is locked or unlocked.

Alternatively or in addition to the preceding embodiments, a non-desktop device such as a touch-ID fingerprint device is used to authenticate and unlock the desktop operating system.

Alternatively or in addition to the preceding embodiments, documents are mirrored to the mobile device(s) for consumption decoupled from the source desktop.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the operations. The various embodiments described herein may also be practiced with other computer system configurations including hand-held devices, microprocessor systems, microprocessor-based or programmable consumer electronics, minicomputers, mainframe computers, and the like.

The examples illustrated and described herein as well as examples not specifically described herein but within the scope of aspects of the disclosure constitute exemplary means for concurrently executing distributed workflows sharing common operations. For example, the elements illustrated in the figures, such as when encoded to perform the operations illustrated in the figures, constitute exemplary means for implementing the operations recited in the Claims and/or otherwise described herein.

One or more embodiments may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of non-transitory computer readable media include a hard drive, network attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

These and other variations, modifications, additions, and improvements may fall within the scope of the appended claims(s). As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

We claim:

1. A method, comprising:
   establishing a mirroring session to a remote desktop associated with a user of a client device, the mirroring session allowing the client device to remotely access the remote desktop to have one or more documents opened on the remote desktop mirrored to the client device, wherein mirroring said one or more documents to the client device comprises performing operations for:
   based on the one or more documents opened on the remote desktop, automatically receiving an indication that mirror commands are queued for mirroring the one or more documents onto the client device;
   based on the received indication, polling for queued mirror commands;
   retrieving, based on the queued mirror commands, the one or more documents;
   using the retrieved one or more documents to mirror, on the client device, via a native viewer available on the client device, the one or more documents opened on the remote desktop; and
   editing the one or more documents on the client device via the native viewer, based on user input, using commands not available on the remote desktop.

2. The method of claim 1, wherein the indication is received upon the remote desktop being left unattended for a period of time.

3. The method of claim 1, wherein the commands include one or more of: touch commands and commands to display the one or more documents to fit a form factor of the client device.

4. The method of claim 1, wherein the one or more documents includes at least a type of document that, upon being opened on the remote desktop, causes the opened document to be automatically mirrored onto the client device.

5. The method of claim 1, wherein establishing the mirroring session to the remote desktop is performed in response to opening a file which is one of a designated file of one or more designated files, the one or more designated files being within a list of files stored on the remote desktop, the list containing files earmarked for mirroring on the client device whenever opened on the remote desktop.

6. The method of claim 1, further comprising:
   receiving, from the client device, commands related to the one or more documents mirrored on the client device; and
   executing the received commands on the mirrored remote desktop.

7. The method of claim 1, wherein a plurality of client devices is associated with the user, and the plurality of client devices includes at least a first client device, a second client device, and a third client device, each of the first client device, the second client device and the third client device mirroring a different document of the retrieved one or more documents.

8. A system, comprising:
   a processor; and
   a memory storing computer executable instructions, that when executed, cause the processor to:
   establish a session by an application executing on a client device to a remote desktop associated with a user of the client device, the session allowing the client device to remotely access the remote desktop to have a desktop service currently open on the remote desktop mirrored onto the client device, wherein the client device is configured to:

based on one or more documents opened on the remote desktop, automatically receive an indication that mirror commands are queued for mirroring the one or more documents onto the client device;

based on the received indication, poll the remote desktop for mirror commands and mirror, onto the client device, via a native viewer available on the client device, the one or more documents opened on the remote desktop; and edit the one or more documents on the client device via the native viewer based on user input, using commands not available on the remote desktop.

9. The system of claim 8, wherein the indication is received upon the remote desktop being left unattended for a period of time.

10. The system of claim 8, wherein the session is established in response to opening a file which is a designated file of one or more designated files, the one or more designated files being within a list of files stored on the remote desktop, the list containing files earmarked for mirroring on the client device whenever opened on the remote desktop.

11. The system of claim 8, wherein the one or more documents includes at least a type of document that, upon being opened on the remote desktop, causes the opened document to be automatically mirrored onto the client device.

12. The system of claim 8, wherein polling the client device is further configured to:

receive, from the remote desktop, a document for consumption at the client device; and terminate the session with the remote desktop.

13. The system of claim 8, wherein mirroring the one or more documents comprises mirroring the one or more documents after detecting a period of inactivity on the remote desktop.

14. An apparatus, comprising:

a processor; and a memory storing at least a mirroring agent and a desktop agent, the processor causing:

the mirroring agent to generate mirror commands queued on a remote desktop related to at least one document open on the remote desktop and to be mirrored to a client device; and the desktop agent to:

automatically receive on the client device, based on the at least one document open on the remote desktop, an indication that the mirror commands are queued for mirroring the at least one document open on the remote desktop;

based on the received indication, poll the remote desktop for the mirror commands relating to the at least one document open on the remote desktop;

retrieve, based on the queued mirror commands, the at least one document;

use the retrieved at least one document to mirror, on the client device, via a native viewer not available on the remote desktop, the at least one document; and edit the at least one document on the client device via the native viewer based on user input, using commands not available on the remote desktop.

15. The apparatus of claim 14, wherein the commands include one or more of the following: touch commands and commands to display the at least one document to fit a form factor of the client device.

16. The apparatus of claim 14, wherein the indication is received upon the remote desktop being left unattended for a period of time.

17. The apparatus of claim 14, wherein the client device is a smart phone or a mobile tablet configured to relay the at least one document to a smart watch for display thereon.

18. The apparatus of claim 14, wherein the at least one document includes at least a type of document that, upon being opened on the remote desktop, causes the opened document to be automatically mirrored onto the client device.

\* \* \* \* \*